US010789615B1

(12) United States Patent
Krishnamurthy et al.

(10) Patent No.: US 10,789,615 B1
(45) Date of Patent: *Sep. 29, 2020

(54) CUSTOMIZED TARGETING FRAMEWORK

(71) Applicant: Reputation.com, Inc., Redwood City, CA (US)

(72) Inventors: Sathya Krishnamurthy, Fremont, CA (US); Shiv Prakash, Redwood City, CA (US); Xiaoshi Xu, Belmont, CA (US); Manish Balsara, Foster City, CA (US); Shrey A. Bhatia, Los Altos, CA (US)

(73) Assignee: Reputation.com, Inc., Redwood City, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 15/336,563

(22) Filed: Oct. 27, 2016

Related U.S. Application Data

(60) Provisional application No. 62/247,405, filed on Oct. 28, 2015.

(51) Int. Cl.
*G06Q 30/00* (2012.01)
*G06Q 30/02* (2012.01)
(Continued)

(52) U.S. Cl.
CPC ..... *G06Q 30/0251* (2013.01); *G06F 16/4393* (2019.01); *G06F 40/10* (2020.01);
(Continued)

(58) Field of Classification Search
None
See application file for complete search history.

(56) References Cited

U.S. PATENT DOCUMENTS 6,519,571 B1   2/2003  Guheen
7,181,438 B1 * 2/2007  Szabo ................. G06F 21/6245
(Continued)

FOREIGN PATENT DOCUMENTS

EP        2264662         12/2010
WO    WO-2008027844 A1 *  3/2008 ............. G06Q 30/02
(Continued)

OTHER PUBLICATIONS

Trademark Electronic Search System (TESS), Facebook, Oct. 17, 2018, United States Patent and Trademark Office (Year: 2018).*
(Continued)

*Primary Examiner* — James A Reagan
(74) *Attorney, Agent, or Firm* — Van Pelt, Yi & James LLP

(57) ABSTRACT

Dynamic targeting customization is disclosed. A template associated with content to be published on behalf of one or more entities is obtained. The template includes at least one targeting parameter associated with a set of users to be targeted. For each entity in the one or more entities, a data store including targeting information pertaining to the entity is queried based at least in part on the at least one targeting parameter included in the template. In response to the query, one or more targeting data values are obtained. An object including the obtained one or more targeting data values is generated based at least in part on the template. The generated object is provided as output to be published on behalf of the entity.

18 Claims, 9 Drawing Sheets

(51) Int. Cl.
*G06Q 50/00* (2012.01)
*G06F 16/438* (2019.01)
*G06F 40/10* (2020.01)

(52) U.S. Cl.
CPC ..... *G06Q 30/0201* (2013.01); *G06Q 30/0241* (2013.01); *G06Q 50/00* (2013.01)

(56) References Cited

U.S. PATENT DOCUMENTS

| | | | | |
|---|---|---|---|---|
| 7,315,826 B1* | 1/2008 | Guheen | ............... | G06Q 10/06 705/7.29 |
| 8,468,244 B2 | 6/2013 | Redlich | | |
| 8,732,023 B2 | 5/2014 | Mikurak | | |
| 2002/0023077 A1 | 2/2002 | Nguyen | | |
| 2004/0193482 A1* | 9/2004 | Hoffman | ............ | G06Q 30/0273 705/14.69 |
| 2004/0205829 A1* | 10/2004 | Hane, III | ............... | H04H 40/90 725/135 |
| 2005/0222906 A1* | 10/2005 | Chen | ............... | G06Q 30/02 705/14.41 |
| 2007/0143186 A1 | 6/2007 | Apple | | |
| 2008/0120129 A1 | 5/2008 | Seubert | | |
| 2008/0120154 A1* | 5/2008 | Dellovo | ............. | G06Q 10/0637 705/14.72 |
| 2008/0147821 A1 | 6/2008 | Dietrich | | |
| 2009/0076983 A1* | 3/2009 | Scumniotales | .... | G06Q 10/0637 705/36 R |
| 2010/0198724 A1 | 8/2010 | Thomas | | |
| 2010/0235219 A1 | 9/2010 | Merrick | | |
| 2012/0101871 A1* | 4/2012 | Lieberman | ......... | G06Q 30/0201 705/7.29 |
| 2012/0150633 A1* | 6/2012 | Chung | ............... | G06Q 30/0241 705/14.49 |
| 2012/0203623 A1* | 8/2012 | Sethi | ................ | G06Q 30/0241 705/14.43 |
| 2012/0310755 A1* | 12/2012 | Sheperd | ............. | G06Q 30/0214 705/14.73 |
| 2014/0006951 A1 | 1/2014 | Hunter | | |
| 2015/0149274 A1* | 5/2015 | Conrad | ............. | G06Q 30/0244 705/14.44 |

FOREIGN PATENT DOCUMENTS

| | | | | |
|---|---|---|---|---|
| WO | WO-2008140418 A1 * | 11/2008 | ............ | G06Q 30/02 |
| WO | 2010027164 | 3/2010 | | |
| WO | 2010126205 | 11/2010 | | |
| WO | WO-2010126205 A1 * | 11/2010 | ............ | G06Q 30/02 |

OTHER PUBLICATIONS

Trademark Electronic Search System (TESS), Instagram, Oct. 17, 2018, United States Patent and Trademark Office (Year: 2018).*
Trademark Electronic Search System (TESS), Twitter, Oct. 17, 2018, United States Patent and Trademark Office (Year: 2018).*
Trademark Electronic Search System (TESS), Google+, Oct. 17, 2018, United States Patent and Trademark Office (Year: 2018).*
Trademark Electronic Search System (TESS), Linux, Oct. 17, 2018, United States Patent and Trademark Office (Year: 2018).*
Trademark Electronic Search System (TESS), Amazon, Oct. 17, 2018, United States Patent and Trademark Office (Year: 2018).*
EMC2. Web Publisher Administration Guide. (Dec. 2005). Retrieved online May 20, 2020. https://www.dellemc.com/en-us/collaterals/unauth/technical-guides-support-information/products/software-2/docu5997.pdf (Year: 2005).*
IBM. Integrating Data With External Applications. (Jul. 7, 2003). Retrieved online May 20, 2020. https://www.ibm.com/support/knowledgecenter/SSLKT6_7.6.1/com.ibm.mif.doc/pdf_mif.pdf (Year: 2003).*
Trademark Electronic Search System (TESS), Amazon, Oct. 19, 2018, United States Patent and Trademark Office (Year: 2018).
Trademark Electronic Search System (TESS), Amazon, Oct. 4, 2018, United States Patent and Trademark Office (Year: 2018).
Trademark Electronic Search System (TESS), Facebook, Oct. 19, 2018, United States Patent and Trademark Office (Year: 2018).
Trademark Electronic Search System (TESS), Facebook, Oct. 4, 2018, United States Patent and Trademark Office (Year: 2018).
Trademark Electronic Search System (TESS), Google+, Oct. 19, 2018, United States Patent and Trademark Office (Year: 2018).
Trademark Electronic Search System (TESS), Google+, Oct. 4, 2018, United States Patent and Trademark Office (Year: 2018).
Trademark Electronic Search System (TESS), Instagram, Oct. 19, 2018, United States Patent and Trademark Office (Year: 2018).
Trademark Electronic Search System (TESS), Instagram, Oct. 4, 2018, United States Patent and Trademark Office (Year: 2018).
Trademark Electronic Search System (TESS), Linux, Oct. 19, 2018, United States Patent and Trademark Office (Year: 2018).
Trademark Electronic Search System (TESS), Linux, Oct. 4, 2018, United States Patent and Trademark Office (Year: 2018).
Trademark Electronic Search System (TESS), Twitter, Oct. 19, 2018, United States Patent and Trademark Office (Year: 2018).
Trademark Electronic Search System (TESS), Twitter, Oct. 4, 2018, United States Patent and Trademark Office (Year: 2018).
Author Unknown, Citrix Service Provider Reference Architecture on Microsoft CloudOS, Jul. 3, 2015, Citrix, https:// nl .insight.com/content/dam/insight/EM EA/nl/hosting/pdf/citrix-microsoft-cloud-os .pdf.
Author Unknown, Designing Secure Multi-Tenancy into Virtualized Data Centers, Dec. 7, 2009, Cisco, https ://www.vmware.com/content/dam/d ig ital marketi ng/vmware/en/pdf/partners/netapp/designing-secure-multi-tenancy-into-virtualized-data-center.pdf.
Qihong Shao, Towards Effective and Intelligent Multi-tenancy SaaS, May 2011, https:// repository.asu.edu/attachments/56326/content/Shao_asu_0010E_10280.pdf.

* cited by examiner

Metadata for Tenant ID: t, Location ID: L2

Location Data: ~~~202
{
    Location_Name: ACME Dealership 2
    Location_Address: 1234 Automall Way
    Location_Phone_Number: (555) 123-4567
    Location_URL: acmedealership2.com
    Location_Manager_Name: Bob Stevens
    Location_Manager_Email: bob.stevens@acmedealership2.com
    Location_email_address: acmedealership2.com
}

Location Profile Data: ~~~204
{
    Location_Description: "ACME Dealership 2 on Automall Way"
    Location_Hours_of_Operation: 9a-5p
    Location_Sales_Phone_Number: (555) 123-4568
    Location_Service_Phone_Number: (555) 123-4569
    Location_Parts_Phone_Number: (555) 123-4560
    Location_Accepted_Payment_Types: Credit Cards, Cash, Debit Cards
}

Targeting Metadata: ~~~206
{
    Sales_Target: Radius: 25 miles
    Service_Target: Radius: 50 miles
}

Budgeting Metadata: ~~~208
{
    Sales_Budget: $50
    Service_Budget: $200
    Page_Likes_Budget: $200
    Boost_Posts_Budget: $50
}

Oauth Token: "ABc123dEf456789gHI01234" ~~~210

FIG. 2

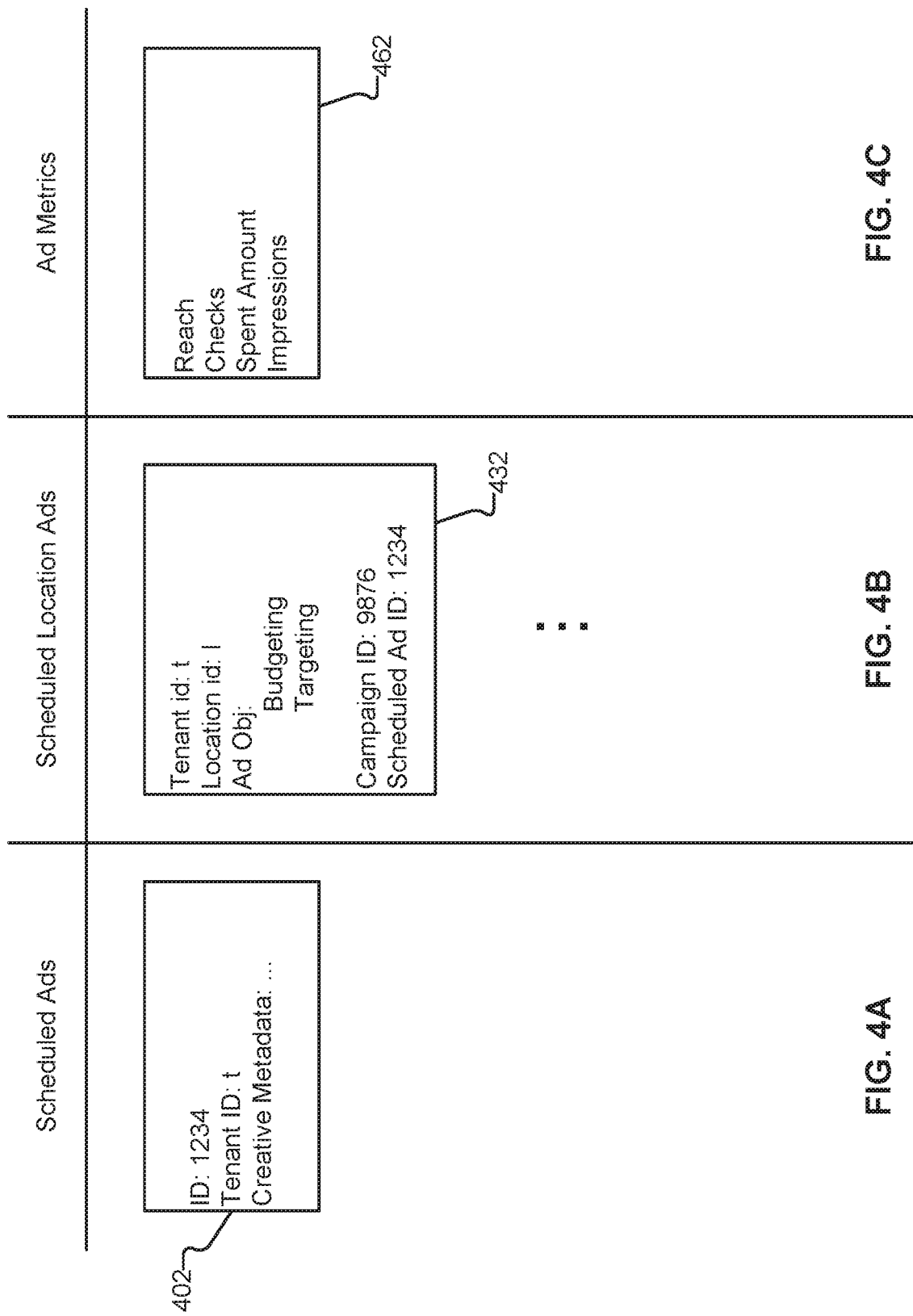

CUSTOMIZED TARGETING FRAMEWORK

CROSS REFERENCE TO OTHER APPLICATIONS

This application claims priority to U.S. Provisional Patent Application No. 62/247,405 entitled MULTI-PAGE AD PUBLISHING PLATFORM filed Oct. 28, 2015 which is incorporated herein by reference for all purposes.

BACKGROUND OF THE INVENTION

In existing content publishing platforms, it may be challenging for entities, such as those with multiple locations, to manage content publishing across multiple pages for those locations. In existing content publishing systems, users are typically required to manually use various files to provision content for the locations, which may be error prone and make it inefficient to publish large volumes of content.

BRIEF DESCRIPTION OF THE DRAWINGS

Various embodiments of the invention are disclosed in the following detailed description and the accompanying drawings.

FIG. 2 illustrates an example embodiment of information associated with a location

FIG. 4A illustrates an example embodiment of a table for scheduled ads.

FIG. 4B illustrates an example embodiment of a table for scheduled location ads.

FIG. 4C illustrates an example embodiment of a table for ad metrics.

DETAILED DESCRIPTION

Figure 1:
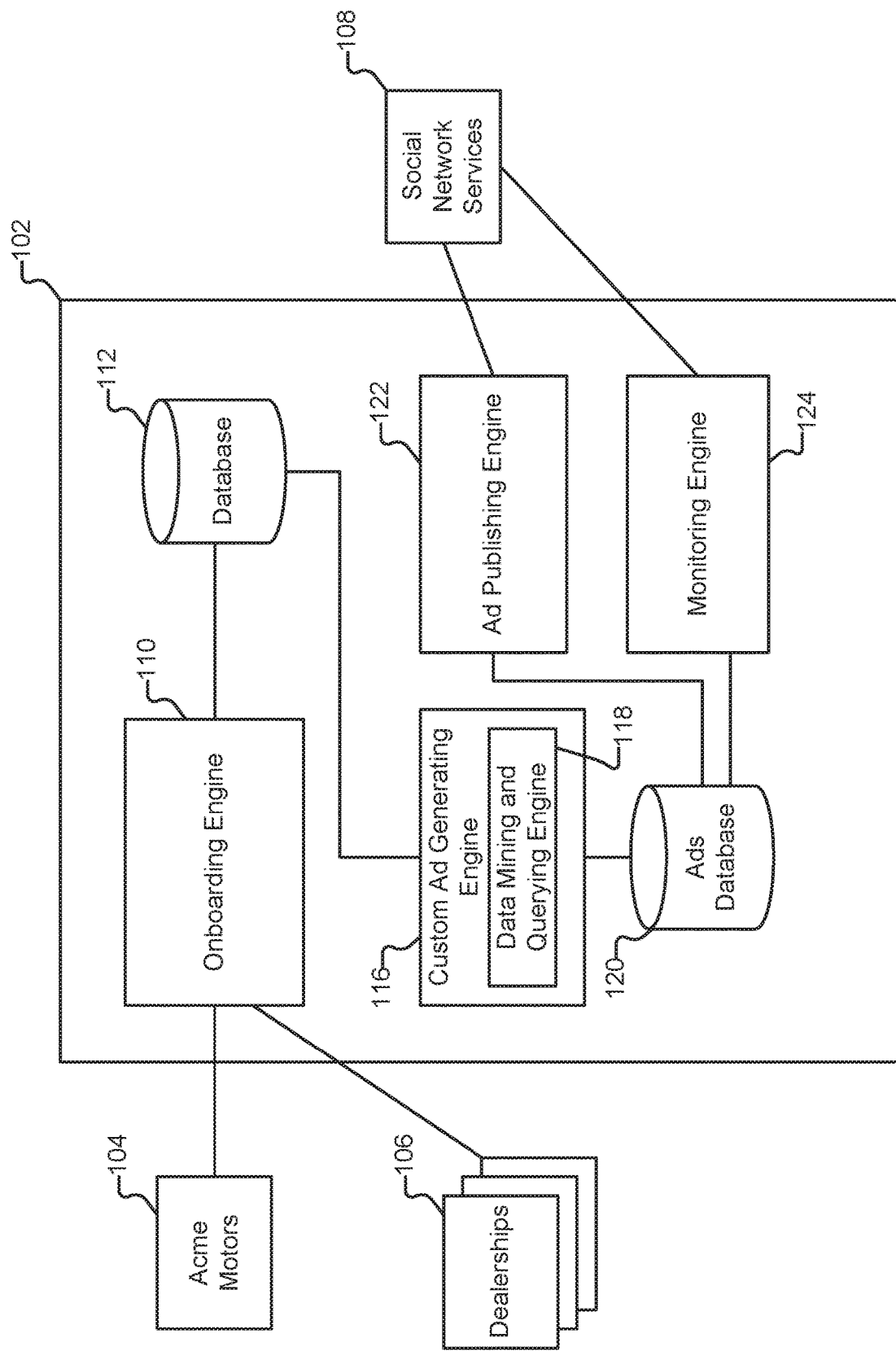
FIG. 1 illustrates an embodiment of an environment in which multi-page advertisement publishing is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein is a multi-page ad publishing platform that allows tenants (e.g., businesses with multiple locations or local branches) to publish ads across multiple social pages (e.g., Facebook, Instagram, Twitter, etc.) to drive user engagement, page views, and lead generation.

In existing ad platforms, such as that provided by Facebook, users are typically not allowed to manage multiple pages/profiles from a single dashboard. So, for example, a user who manages multiple pages (e.g., an administrator user (or "admin") who manages one or more social media pages and has the permission to create ads for those locations/pages they manage) may have to use files such as comma separated values (CSV) files to provision ads. This may be extremely error prone, especially when a large volume of ads are to be created and published. Further, any metadata generated during an ad publishing run is typically not stored, and thus, subsequent ad publishing runs need to be created from the ground up, even if the admin wishes to use the same audience targeting (e.g., target audience to which an ad is to be surfaced), behavioral information, etc. as selected in the previous ad publishing run.

Such challenges and problems may be addressed using the multi-page ad publishing platform and template-based dynamic ad customization described herein. As will be described in further detail below, coupled with detailed information maintained for tenants and their locations, such as addresses, geo codes, social pages, OAuth tokens, etc., ads may be customized per location at a level not previously possible using the dashboards provided by existing ad platforms. For example, a single ad may be dynamically customized for multiple locations (i.e., on a per-location basis), while retaining the "look and feel" of the ad across the social media pages for the different locations.

In some embodiments, per location ad customization is supported by the ability to create variable-based advertising. For example, as will be described in further below, templates may be configured to include location level variables for automatic substitution when generating ads to be published. Configuration of targeting and budgeting may also be customized on a per location basis. Using the techniques described herein, a single ad may be pushed to multiple locations, where the single ad is customized for the multiple locations. In some embodiments, the variable-based advertising described herein simplifies creation of variations of ads across locations.

The following are examples of templates used in variable-based advertising. In these examples, templates for ads to be published on behalf of various dealership locations under the automotive brand ACME Motors are shown.

> Come checkout our new ACME AQ7 Inventory today at {{location_name}}, {{location address}}
>
> Call us to test drive the new ACME AQ7 {{location_phone}}
>
> Check out the features of the new ACME AQ7 {{location_url}}/newAQ7.

In the examples above, the variables "{ }" are auto-inserted at the time the ads are created and launched, resulting in unique ads for each location that share, for example, the same "look and feel."

Further details regarding template-based ad customization are described in further detail below. In some embodiments, ads may be paused, redone, and monitored across locations. In some embodiments, ads may be stopped across locations.

As will be described in further detail below, location level information may be used to create custom targeting per location. Pre-defined targeting information on a per-tenant level may also be used. Such tenant level defined targeting may be customized by a location as well. In some embodiments, ads may be scheduled for launch at a future date. Additionally, tenants may be allowed to use multiple ad accounts. Ad level metrics may also be provided on a per location level. Further, ad runs may be co-related with increases in user engagement, lead generation, etc.

FIG. 1 illustrates an embodiment of an environment in which multi-page advertisement publishing is provided. In this example, suppose that Acme Motors (104), an automobile brand that is an example of a tenant, is a subscriber of ad publishing platform 102. Suppose also that Acme Motors has 100 dealerships (106) (locations of the tenant ACME Motors) across the United States, for whom ACME Motors has purchased social media reputation packages. Each of these dealerships may have its own set of accounts on network service 108. Examples of network services include social media services such as Facebook, Instagram, Google+, etc. Ads for Acme Motors may be posted to the respective pages for the dealerships. In this example, ad publishing platform 102 is configured to manage ads for ACME Motors that are published to network service 108. (i.e., platform 102 manages ACME Motors network service accounts on ACME Motor's behalf). As will be described in further detail below, the services provided by platform 102 allow tenants to publish ads that are customized on a per-location basis.

Platform 102 is illustrated as a single logical device in FIG. 1, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, platform 102 is a scalable, elastic architecture comprising distributed components, including components provided by one or more third parties (e.g., provided by Amazon Web Services). Further, when platform 102 is referred to as performing a task, such as storing data or processing data, it is to be understood that a sub-component or multiple sub-components of platform 102 (whether individually or in cooperation with third party components) may cooperate to perform that task.

While an example embodiment involving the social media network Facebook and a tenant affiliated with a large entity such as a franchise is described in FIG. 1, the techniques described herein can variously be adapted to accommodate any social media network service(s), as well as tenants corresponding to businesses with a single location (e.g., a dentist's office with a single office), a small set of locations (e.g., a coffee shop business with four locations), or any other number of locations (e.g., a hospital that has many practitioners).

Tenant Setup/Onboarding

In the example environment of FIG. 1, ACME Motors has its own tenant account with platform 102. Each of the dealerships may also have its own account with platform 102 (e.g., set up and maintained by the dealerships' respective office administrators). In various embodiments, platform 102 allows for the delegation of account setup/management. For example, a member of the ACME Motors marketing department can set up a single account on platform 102 that can be used to manage the posting of content on behalf of multiple locations. The ACME Motors representative can also create company defaults, such as defaults for ad audience targeting and ad budgeting targeting, as will be described in further detail below. In various embodiments, hierarchical account access controls are made available by platform 102—e.g., with national/regional administrators of ACME Motors able to help manage accounts of individual dealerships on platform 102.

In some embodiments, the multi-page ad publishing techniques described herein leverage detailed data collected or otherwise obtained about a tenant and their locations, such as address, geo codes, social pages, OAuth tokens, targeting preferences, budgeting preferences, etc., which are used to customize ads on a per location basis. The various metadata may be stored at the tenant level as well as the location level. The metadata may be stored in a database such as database 112. In some embodiments, the tenant and location data is obtained as part of an onboarding process facilitated by onboarding engine 110. In various embodiments, the tenant and location data may be provided using a web front end provided by platform 102. Users such as administrators associated with ACME Motors and its dealerships may log into platform 102 (e.g., over a network such as the Internet) and provide data about the tenant and its locations.

In some embodiments, the information that may be associated with each location includes location data, location profile data, targeting data, and budgeting data. Further details regarding the information associated with a location are discussed below in conjunction with the example of FIG. 2, which illustrates an example embodiment of information associated with a location (identified by a location identifier) under a tenant (identified by a tenant identifier). In some embodiments, the information associated with each location (and tenant) is stored to a data store such as database 112. In some embodiments, each location is associated with a corresponding location object stored to database 112. In one example embodiment, database 112 is implemented using Mongo DB.

Location Data and Location Profile Data Framework

In this example, data is collected for each of the 100 ACME Motors dealerships. The collected data may include location data as well as location profile data collected for each location.

In various embodiments, the location data (202) corresponding to a given dealership includes the name, address, phone number, website, manager name, manager email, location contact details (e.g., sales, service, and/or parts phone numbers and/or email addresses), or any other appropriate location data.

In various embodiments, the location profile data (204) corresponding to a given dealership includes a description of the dealership, hours of operation, accepted payment types, etc. The location profile information may also include a URL (Uniform Resource Locator) for the dealership's Facebook page, as well as a corresponding OAuth token (210), which will be used by platform 102 to publish ads or post content to the dealership's Facebook profile page.

In some embodiments, the location data and location profile data is entered by an administrator associated with the locations (e.g., ACME Motors representative or dealership representative). For example, the per-location metadata is entered manually via a web interface. In some embodiments, a dealership's Facebook page is automatically determined using an autofind process, in which platform 102 automatically searches for the Facebook page for each location based on known data about the location (e.g., phone number, address, etc.). For example, platform 102 is configured to use information about a given dealership to perform a search for the dealership's Facebook page using a general search engine such as Google or Facebook's site specific search engine.

The location data and location profile data for each and every dealership is thus obtained.

In this example, ACME Motors, at the top, parent (tenant) level, also specifies or allocates, for every dealership, four kinds of ads (e.g., types of ad campaigns) that can be run on the dealerships' Facebook pages, which include sales ads, service ads, page likes (to increase the number of page likes), and boost posts (to boost the number of views for a previously launched post).

Targeting Framework

In this example, each dealership is also associated with targeting information or metadata. In some embodiments, the targeting metadata defines the target audience segment (e.g., particular group of Facebook users) for ads published to the Facebook page of a given dealership. Different dealerships may have different target definitions based on their requirements and/or preferences.

For example, a dealership in the San Francisco Bay Area may wish to target Facebook users in San Jose, Oakland, and Marin County. A dealership in Brooklyn may wish to target Facebook users in zip codes that target specific zip codes in Brooklyn.

Using the targeting framework described herein, dealerships can customize their targeting preferences. In this example, the targeting options include those usable by Facebook (i.e., Facebook accepts targeting attributes of certain types and formats that are configured or specified in a particular way). In some embodiments, the targeting attributes are stored in a targeting object at a location level.

One example of a targeting definition is a radius (e.g., 10 miles, 25 miles, etc.) around a reference point (e.g., the address of a dealership). An ad posted to the dealership's page will then be surfaced to Facebook users within the specified radius of the dealership. As another example, the targeting definition may be specified by selecting one or more zip codes (i.e., the ad should be targeted to Facebook users within the specified zip code). Another example of a type of target that can be specified is a designated market area (DMA) code, which describes a region (e.g., geographical region such as San Francisco Bay Area, New York area, etc.) to which ads should be targeted. Other examples of targeting parameters that can be specified (and utilized/recognized by Facebook) include demographic information, such as interests (e.g., known to Facebook), gender, age (e.g., range such as 18-25), ethnicity, etc.

In this example involving publishing ads to Facebook, another example of a targeting definition that is customizable for a dealership is a behavior identifier. In some embodiments, Facebook utilizes behavior identifiers (ids), which correspond to different segments of its users. For example, Facebook may have a behavior ID that corresponds to its users that like ACME Motors, or have purchased ACME Motors cars in the last two years. A dealership can customize their corresponding targeting metadata to specify or select particular behavior IDs known to Facebook that should be targeted.

In some embodiments, rather than targeting groups of Facebook users that share certain characteristics, specific individuals may be targeted for ads. Further details regarding such custom audiences will be described in further detail below.

In some embodiments, different target definitions may be configured for different campaign objectives or types. For example, for a sales campaign, a dealership can specify a broad target audience that is in a large radius (e.g., 50 miles), whereas for a service campaign (e.g., for a promotion on oil changes), a user associated with the dealership may specify a target audience of their customers within a smaller radius (e.g., 15 mile radius centered on the address of the dealership). Examples of targeting metadata for different campaign types are shown at 206.

In addition to sales and service campaign types, other examples of campaign types include local awareness campaigns (e.g., page likes) and boost post campaigns. In some embodiments, boost posts are an example of post engagement ads, in which the reach of a previously published post is boosted. For example, while a post on a page of a dealership may initially only be shown to users that have liked the dealership's page, purchasing a boost post allows, for example, the page to be surfaced to the feeds of friends of the users that have liked the dealership's page. Different targeting objects (with different sets or combinations of targeting attribute values) can be specified for different campaign objectives.

A location may have one to many targeting objects (corresponding to different audience segments) under one to many campaign objectives. For example, a campaign objective of post engagement may have multiple associated targeting objects. As will be described in further detail below, when an ad campaign is specified, an option to select one of the targeting objects (to include in an ad object template) is provided. For example, a template may be created that includes the variable, field, or parameter name for a particular type of targeting object (e.g., sales target object).

In some embodiments, the tenant ACME Motors specifies default targeting definitions at a corresponding tenant level which are inherited by all of the dealerships. The individual dealerships may override the tenant default targeting configuration (e.g., the location's own preferences override the tenant's in importance). For example, an office administrator for a dealership may log into the dealership's account on platform 102 (e.g., via a web interface over the Internet) and access the targeting definitions and customize them to their individual dealership (e.g., choose a location-specific radius or zip code for ads associated with a certain type). The specification or definition by the dealership of a targeting object of a particular type (e.g., sales target) will override the default targeting object specified by the tenant.

As one example, suppose that ACME Motors specifies a default target audience radius of 25 miles. A dealership in the Midwestern United States, which services a large geographic area, may specify its own target audience radius of a larger value, such as 50 miles, overriding the tenant specified default. As another example, the dealership may change the targeted zip codes from the default set of zip codes specified by the tenant. As will be described in further detail below, if targeting has been specified at the location level, the location level targeting values are used when launching an ad campaign. If targeting has not been specified at the location level, then the tenant level specified default values may be used.

In some embodiments, the targeting metadata is stored or included along with a location's location (profile) data. For example, the targeting metadata is stored as a targeting object along with a corresponding dealer's information in database 112.

As the targeting objects configured at the location level (and also default targeting objects at the tenant level) are stored in a database such as database 112, they can be reused and selected in future campaigns, without, for example, requiring a user to again set up targeting for a new campaign. For example, for a new campaign, a previously used set of targeting attributes (e.g., same audience segment is to be targeted) that has already been verified once before can be reapplied.

Budgeting Framework

In this example, each dealership is also associated with budgeting information or metadata (e.g., at 208). As with targeting, each dealership may have its own budgeting specification. In some embodiments, the budgeting metadata defines how funds should be allocated and classified. For example, as with targeting, the budgeting may be specified based on campaign type.

In some embodiments, the tenant, ACME Motors, specifies default budgeting definitions, which are inherited by all of the dealerships. The individual dealerships may override the tenant default budgeting configuration. For example, an office administrator for a dealership may access their budgeting definitions and customize them to their location (e.g., change the allocated budget for ads associated with a certain campaign type).

As one example, suppose that ACME Motors, during onboarding, specifies default budgeting as follows: $100 default budget for sales ads; $100 default budget for service ads; $100 default budget for page likes; and $100 default budget for boost posts. Each dealership will inherit the tenant specified default values (e.g., the default values will be included in the dealership's metadata). A dealership can change the default values and customize the budgeting for their particular location. For example, the office administrator for a dealership may log into the dealership's account on platform 102 (e.g., via a web interface over the Internet) and may specify that they would like to increase their service ad budget monetary amount to $200, as they perform a large amount of service.

As with targeting, if budgeting has been specified at the location level, the location level budgeting values are used when launching an ad campaign. If budgeting has not been specified at the location level (or a budgeting object has not been specified for a type of campaign of interest), then the tenant level specified default values may be used instead.

Budgeting can be specified on a per-campaign type or campaign objective basis (e.g., different budgets for sales campaigns versus service campaigns versus parts campaigns versus local awareness campaigns versus post engagement campaigns). The different amounts allocated to different types of campaigns for a dealership may also be determined based on the advertising package purchased for the dealership. For example, dealers may purchase (or have purchased for them) packages in a tiered ad package system, which define how much may be spent on different types of advertising. Different packages may have different pre-allocated models for how money is to be distributed. For example, a $250 ad package may specify that 50% of the budget will be spent on sales, 25% on service, 15% on boosting pots, and 10% on any other types of ads, whereas another package may have a different budget allocation or breakdown.

In some embodiments, budgeting is customized by optimization goals. For example, a dealer can allocate different amounts of money based on their goals, such as whether they would like more views, more people taking actions, etc. (e.g., optimizing for cost per click (cpc) versus cost per impression (cpm)). The different locations may optimize their budgets based on their different goals or preferences. For example, a location (or tenant on behalf of the location) may specify defined budgets for clicks and impressions.

Another example of a budgeting attribute/metadata includes spend caps. The spend cap may be a cap on the maximum amount that can be spent on advertising, for example, within a time period such as a month. As another example, a daily budget may be specified. In other embodiments, a spend cap may indicate a cap on the amount that may be spent for every campaign. Spend caps for different types of campaigns can also be defined (i.e., per campaign spend caps at the campaign level). The spend cap may be used to prevent the launching of a campaign that exceeds the maximum allowed amount.

As will be described in further detail below, when launching ads on behalf of the dealerships, the different budgeting configuration for the individual dealerships will be leveraged and monitored to control budgeting on a per-dealership basis.

In some embodiments, the budgeting metadata is stored or included at a location level, for example, along with information associated with the location In some embodiments, the budgeting metadata includes auditing metadata. In this example, the auditing metadata or attributes are used to keep track of the funds that are being used for ad campaigns, such as where the money is going, who is using it, who is auditing the budgeting attribute values (as well as targeting values), etc.

In one example embodiment, the budgeting metadata is stored using a relational database system such as Postgres (in another portion of database 112 or in a separate database).

As shown in the example of FIG. 2, each of a location's particular values is associated with a corresponding parameter or field name. As will be described in further detail below, the variables included in the templates match to the parameters specified in the location objects for the dealerships that are stored in database 112.

Launching an Ad Campaign

Now suppose, for example, that ACME Motors has a new vehicle model, the AQ7, and would like to launch a Facebook ad campaign for the model. In some embodiments, the ad campaign may be launched via a dashboard, which in this example includes the interfaces shown in FIGS. 3A and 3B, which will be described in further detail below.

In this example, a representative of ACME Motors' marketing department sends campaign parameters to platform 102. The campaign parameters may include an ad component such as the creative (e.g., images or text) to include in an ad. The campaign parameters may also include campaign guidelines, such as a corresponding campaign type (e.g., sales campaign or service campaign) and a campaign objective (e.g., to generate leads). The campaign parameters may also include other guidelines, such as to append a URL portion to each dealership's website that points to a landing page describing the new electric vehicle (e.g., "/acmeaq7" should be appended to each dealership's website). The campaign parameters may be uploaded to the platform (e.g., via a web interface, email, etc.).

In some embodiments, the campaign is also associated with a set of locations (e.g., all ACME Motors dealerships, only those dealerships in the Western United States, only those dealerships that have purchased a particular ad or social media package, etc.) on whose Facebook pages the ad should be published.

For example, in some embodiments, an admin, via a UI or dashboard, can select the dealerships to which the ad should be published. As one example, the admin may select a geographical region, such as the Western United States. Platform 102 will then identify, based on the user selection, which dealerships are in the specified geographical region (e.g., based on the zip code of a dealership to determine whether the dealership is in the specified geographical region). Various types of filters may be used to determine what dealerships should be included in the ad campaign.

In some embodiments, the location identifiers for the identified dealerships are obtained, and will be used to perform ad object template localization, as will be described in further detail below. For example, Facebook ad objects will be created for each of the identified locations. For a given Facebook ad object corresponding to a particular dealership, the location ID for the particular dealership will be used to perform data mining, for example, by querying database 112 to retrieve values specific to the particular dealership that are used to populate corresponding variables specified in an ad object.

In some embodiments, the target audience for the ad campaign can also be specified. As one example, a variable can be placed that matches to a particular targeting object in the location data, such as a sales targeting object, service targeting object, etc. As another example, the targeting variable can specify a behavioral ID, which can be queried for and obtained from Facebook. For example, a marketing manager can select a behavioral ID corresponding to an audience segment to which the ad is to be surfaced. The behavioral ID can be combined with the targeting metadata for a location when an ad object instance is generated. For example, a behavioral ID may be logically ANDed with a location's specified target radius for sales type campaigns (e.g., all FB users that match to the criteria of a behavioral ID AND that are within a 15 mile radius of the dealership). Similarly, a type of budgeting for the campaign may also be specified.

In some embodiments, upon receiving the campaign parameters, an ad object template is generated based on the received campaign parameters.

Figure 3A:
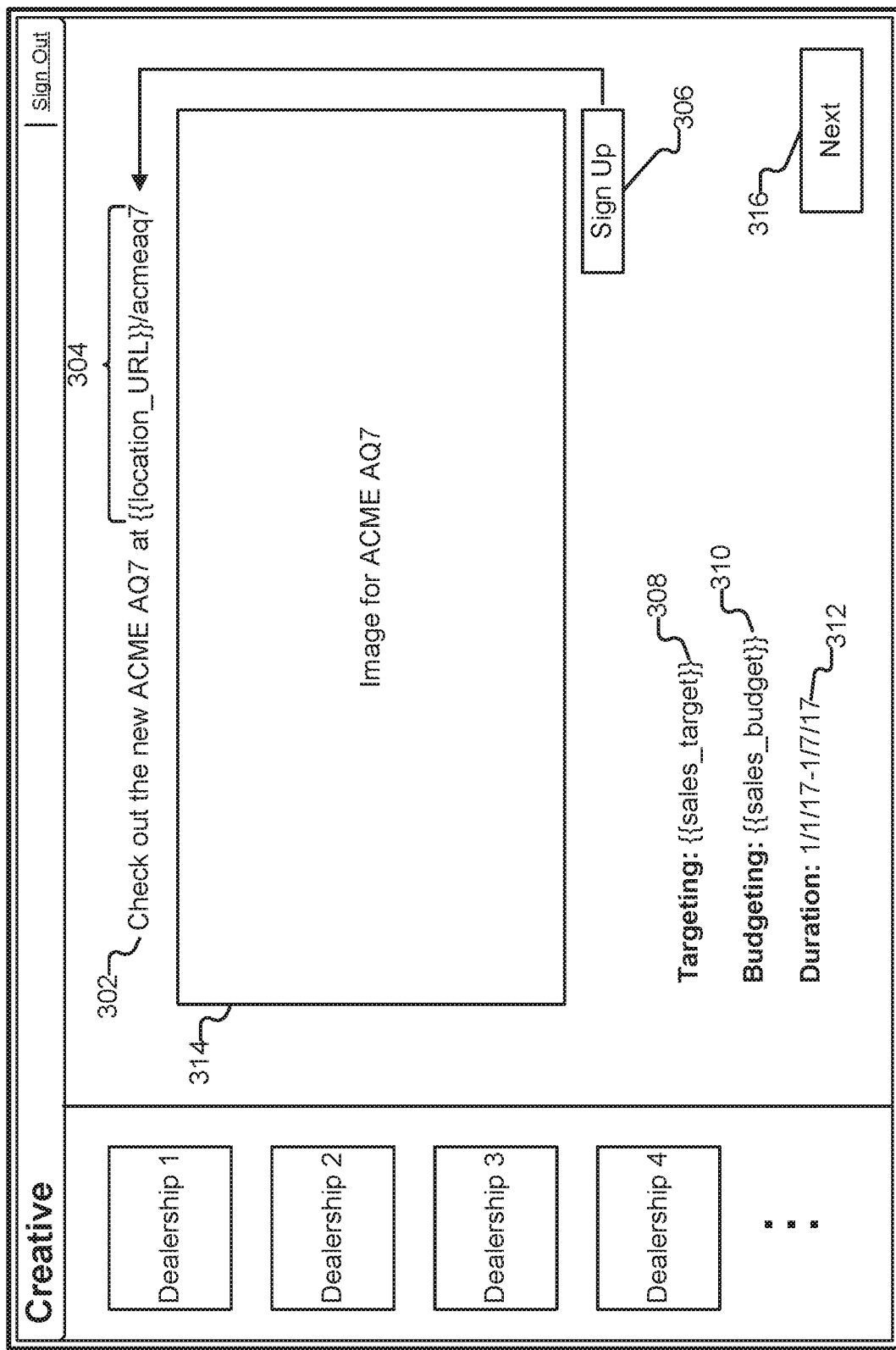
FIG. 3A illustrates an example embodiment of an ad object template.

FIG. 3A illustrates an example embodiment of an ad object template. In this example, a user interface for configuring an ad template is shown. For example, an ad template is configured that includes ad creative such as the image (314), as well as a text blurb (302) that describes the ad (e.g., "Check out the new ACME AQ7"). The creative 302 and 314 will be common to all of the published ads, regardless of dealership.

In this example, because the objective of the campaign, as specified by ACME Motors, is to generate leads, a link to a signup page where end users can submit their emails to subscribe to future information about the new electric car is also added to the ad template.

In this example, the landing page for the lead generating sign-up page is the base URL for a dealership appended with the "/acmeaq7" (304) specified by ACME Motors. In this example, a button (306) to sign up to check out the new ACME Motors model will be included in the ad, which refers to the link. In some embodiments, the landing page used to generate leads is referred to as a "call to action" in the ad template, as it refers to the specification of an action that an end user is desired to make upon viewing the ad (e.g., click on the link to the new ACME Motors AQ7 model). Another example of a call to action is a link that when clicked will direct a user to the dealership's inventory. Other examples of calls to action include clickable phone numbers that when clicked, cause the phone number of a location to be automatically dialed (e.g., when accessed from a mobile application or "app" on a mobile device such as a smartphone). Another example of a call to action is a clickable link that will direct a user to directions for the dealership (e.g., causing a mobile navigation application or "app" to be opened on the device with directions to the dealership).

In this example, because the base URL for the different dealerships will be different, a variable {{location_URL}} is included in the ad template at 304, which will be automatically localized on a per-dealership basis (e.g., the appropriate values will be automatically filled in or populated or inserted for each and every dealership, as part of ad customization) when the ad is run or launched.

In some embodiments, the ad object template also includes a specification of a targeting object (308) to be included in posted ads. In this example, because the campaign is a sales-type campaign, the ad template is included with a variable to obtain and automatically insert, from location database 112, the location's sales targeting object (e.g., versus service or parts targeting object) when launching ads for each dealership. In some embodiments, combinations of targeting objects (e.g., logical Boolean combinations using AND and/or OR) can be specified (e.g., combinations of behavior IDs, email address lists, campaign type targets, etc.)

Similarly, a variable for obtaining sales budgeting (310) is also included in the ad template.

In some embodiments, the ad object template also includes a configuration of the duration of the ad to be launched (312). For example, a start and end time may be specified for the ad campaign, specifying the lifetime of the ad.

Variables for any metadata maintained for a location such as location (profile) data (304), targeting metadata (308), and budgeting metadata (310) may be specified in the template. In some embodiments, the variables match to the names of variables or fields of metadata stored for locations (e.g., as shown in the example of FIG. 2).

The ad template may be generated manually, for example, by a managed services team. In one example embodiment, the ad object is implemented as a comma separated values (CSV) file.

In some embodiments, the ad object template is created via a front end (e.g., via the UI of FIG. 3A by users via a web interface or application) of platform 102. Once the template is configured, it may be used to generate per-location customized ads. As will be described below, the variables in the template will automatically be filled or populated or inserted with the values that have been set up for the various dealerships.

Upon configuration of the ad template (e.g., creative configuration, targeting configuration, budgeting configuration, etc.), a user of the managed services team may then select the "next" button 316 to proceed to the next step of launching the campaign.

Template-Based Ad Object Creation.

Returning to the example environment of FIG. 1, given the particular template that has been created, Facebook ad object instances for each of the dealerships are dynamically customized, which will ultimately be published to the Facebook pages of the dealerships. In this example, dynamic customization includes generating, for each dealership, an instance of the template, where the dealership ad instance includes values localized to the dealership. In some embodiments, the generation of the per-location custom ads is performed by custom ad generating engine 116 of FIG. 1. In this example, 100 instances of the ad object will be generated corresponding to the 100 dealerships.

Each of the instances will be localized for the corresponding dealership by using or leveraging the values seeded in the location data, targeting framework, and budgeting framework implemented on platform 102, as described above. For example, for a given dealership, the given dealership's tenant and location identifier (previously determined when identifying the locations on behalf of which the ad campaign should be launched) is used to access the given dealership's location metadata in location database 112.

For each variable configured in the template of FIG. 3A, a query (or queries) of the location metadata associated with the given dealership (where each dealership is associated with a unique combination of tenant identifier value and location identifier value, string, etc.) is sent to database 112. In some embodiments, the querying and data mining is performed by data mining and querying engine 118 of FIG. 1.

An example of a query is as follows:

Query=>tenant=t & location=<L100>& obj=sales_leads

The values corresponding to the variables are obtained. For example, for a given location, the base location URL, targeting metadata for sales campaigns, and budgeting metadata for sales campaigns are obtained and inserted into the appropriate portions of the ad object instance (i.e., according to the template configuration/setup). Thus, each Facebook ad object includes the parameters (e.g., location data, targeting, and budgeting) specific to a corresponding dealership, based, for example, on their requirements and/or preferences.

In some embodiments, before launching the 100 ads, a user may view a preview of what each of the ads will look like. For example, after an ad object template is created and locations are selected, an admin may preview how the ads will look for the different locations.

Figure 3B:
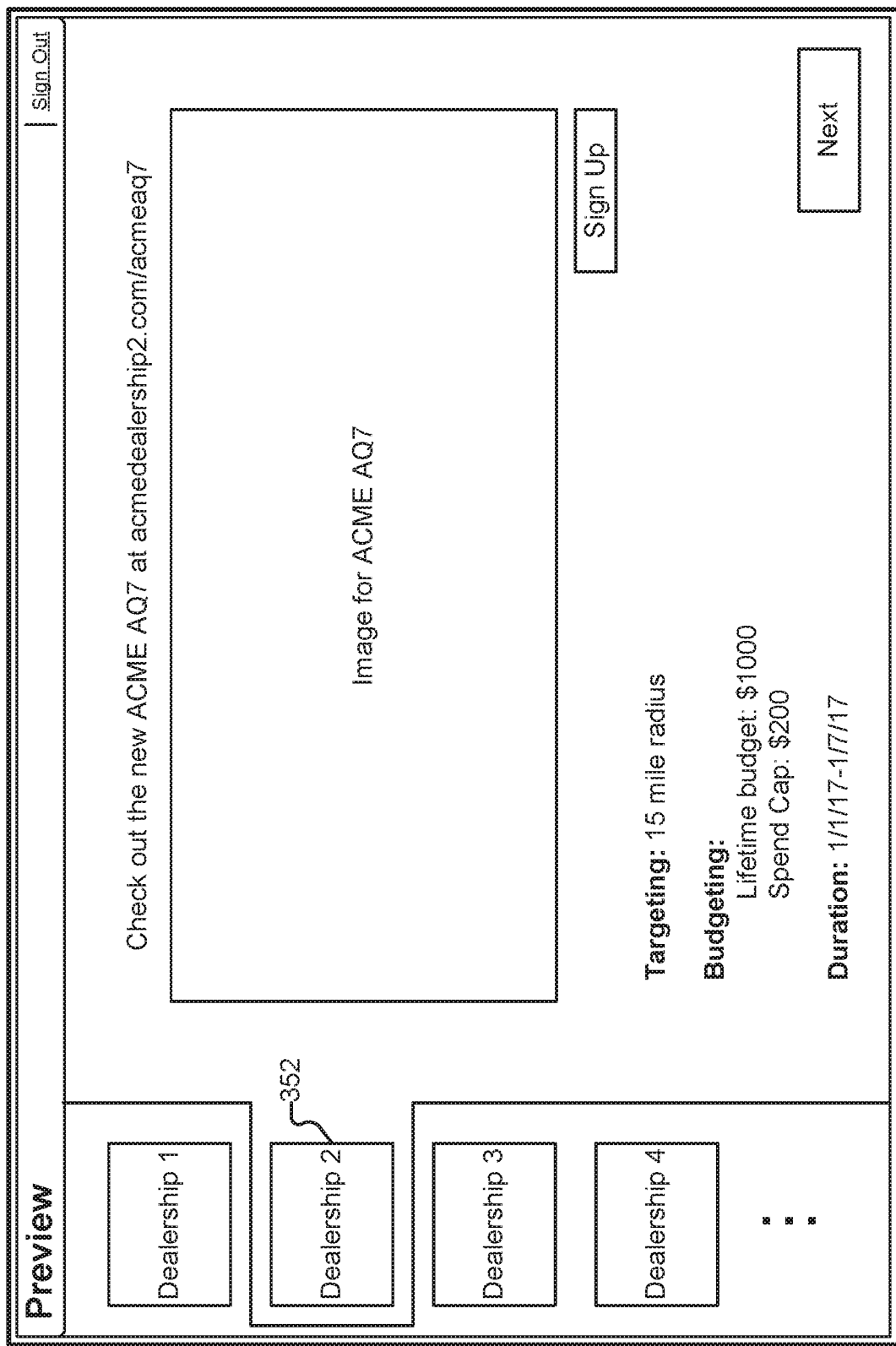
FIG. 3B illustrates an example embodiment of an interface for previewing per-location customized ad objects.

FIG. 3B illustrates an example embodiment of an interface for previewing per-location customized ad objects. In the example of FIG. 3B, a preview for dealership 2 (352) is shown. As shown in this example, the variables specified in the example template of FIG. 3A have been populated with corresponding values specific to dealership 2.

The preview that is shown may be different for different campaign types (e.g., local awareness versus post engagement), which may have different attributes that are required to launch (e.g., different Facebook requirements for different types of campaigns that can be launched). For example, a boost post campaign on Facebook will require the identifier of the previously published post that is to be boosted (otherwise Facebook will return an error indicating that a boost post is being attempted on a post that does not exist). The previewing may be used to verify or validate that the requirements of the campaign are being fulfilled, in addition to verifying that the correct information is being included in each location's ad object.

After previewing the ads, the marketing representative for ACME Motors may then launch the campaign. As described above, in some embodiments, launching the ad includes generating, from the ad object template, location-specific ad object instances corresponding to each of the dealerships. In some embodiments, generating an ad object instance includes creating an instance that includes the data included in the ad object as well as the location-specific values corresponding to placeholder variables or fields in the template.

In some embodiments, when populating a variable for an ad object for a location, the location's metadata is searched to determine appropriate information to fill in the variable. In some embodiments, if the location does not have corresponding values, then it is determined whether a tenant has defined a default value for the variable or field. For example, if the targeting or budgeting object for a sales campaign has not been defined for a particular location, then the tenant metadata is queried to obtain a default value for the targeting or budgeting object.

When the ad is launched, the 100 customized dealership Facebook ad objects are automatically generated or set up. For example, in some embodiments, file(s) such as CSV file(s) are generated based on the populated and customized per-location ads. The ads are then published, exported, or uploaded over a network such as the Internet to the Facebook pages of the respective dealerships (e.g., by ad publishing engine 122 using a Facebook application programming interface (API) integration), for example, using the dealerships' respective Facebook OAuth tokens, which may be obtained from the dealerships' metadata. Each Facebook ad object includes the location data, targeting, and budgeting specific to the campaign and a dealership. In some embodiments, the ad object instance creation, as well as querying of location metadata and localization of the ad instances, is done at the time of publishing. In some embodiments, each created ad object instance is associated with corresponding tenant and location identifiers (e.g., tenant ID for ACME Motors and location ID for a particular dealership, as stored on platform 102).

As shown, dynamic customizations of ads may be performed by leveraging pre-seeded location metadata, targeting metadata, and budgeting metadata stored on a per-location basis, as well as templates. By including variables in a template that refer to such per-location metadata (i.e., the variables in the template match to variables or fields of the metadata stored for a location), each instance of an ad can be customized for a given location or entity. Using such a template-based ad launching that leverages location data, a large number of ads stemming from a single campaign can be quickly and efficiently generated, where the ads retain the same look and feel, but are customized for a specific location.

As shown, the process for customizing ads can be performed via a user interface (UI) or dashboard that allows a user to dynamically generate ads with a small number of clicks or a small amount of time. For example, once the details of an ad campaign are obtained (e.g., creative content, tenant locations on behalf of which an ad campaign should be launched, etc.), an ad object template with placeholder variables may be configured, and per-location customized ads are automatically previewed and created according to the template.

In some embodiments, information associated with the ads that have been launched is stored in various tables. In some embodiments, entries are made into tables, which, for example, are for storing scheduled ads, scheduled location ads, and metrics related to the ads. FIGS. 4A, 4B, and 4C illustrate example embodiments of tables that support the functionality described herein. In some embodiments, the tables of FIGS. 4A, 4B, and 4C are stored in ads database 120 of FIG. 1.

For example, as described above, a single ad campaign may result in multiple ads being published on behalf of numerous locations. In some embodiments, when a campaign is launched, a record of the campaign and associated information is stored as an entry in a scheduled ads table such as that shown in FIG. 4A. For example, ads may be scheduled for launch at a later date. In this example, entries for each of the location ads being published are made into the location ads table of FIG. 4B. As will be described in further detail below, metrics and insights associated with the performance of the campaign may be collected and stored to the ad metrics table of FIG. 4C.

FIG. 4A illustrates an example embodiment of a table for scheduled ads. As described above, in some embodiments, an ad object template includes information needed to launch a particular ad. For example, the ad object template includes raw metadata for the ad that will be common to all locations (e.g., the template does not include values that are specific to particular locations, but will instead be common across the locations—any values that will be specific to locations will have placeholder variables in the template).

In the example of FIG. 4A, the scheduled ads table includes the metadata for an ad that will be common across all the locations. For example, scheduled ad entry 402 includes the corresponding tenant identifier. As another example, the common information includes metadata associated with the creative component of an ad object, such as an image, text, description, etc. Such creative component metadata is not associated with any particular location, and will be reused for the per-location ads (i.e., the creative components associated with an ad's look and feel are common across the locations). In some embodiments, the metadata for a campaign that is stored to the scheduled ads table includes a campaign identifier that is provided by Facebook once the campaign has launched. Further details and examples of scheduled ads are described below.

FIG. 4B illustrates an example embodiment of a table for scheduled location ads. As described above, using a template, an ad object (in a format usable by Facebook) is created for each location that includes not only the data common across locations, but also the location-specific values for targeting, budgeting, etc. In some embodiments, each location ad entry stored in the scheduled location ads table is associated with a parent identifier of the ad object template from which the location-specific ad is derived. For example, the ad object template corresponding to scheduled ad entry 402 stored in table 400, identified by its corresponding identifier, will result in 100 dealership ads. The scheduled location ads table of FIG. 4B will then include entries corresponding to the 100 dealership Facebook ad objects that are scheduled to be launched, each of which links back to the scheduled ad 402.

In the example of FIG. 4B, an example of an entry for a particular location is shown at 432. In this example, the parent tenant ID is shown. The identifier of the location for this particular ad is also shown. The ad object instance is also included in the entry which includes, for example, budgeting, targeting, and any other values that are specific to the particular location. In some embodiments, the associated metadata for a scheduled location ad includes a campaign ID and the parent scheduled ad ID (corresponding to the scheduled ad ID in entry 402). In some embodiments, the campaign ID is provided by Facebook, after the ad for the location has been published to Facebook (where Facebook treats each posting of the ad to the various dealerships' pages as separate ad campaigns). Further details and examples of scheduled location ads are described below.

Additional details and examples of data models, structures, objects, and components associated with template-based, per location dynamic object customization and multi-page publishing are described below.

Monitoring the Ad Campaign

After the ads have gone live and are published, the performance of the ads may be monitored. The ads may be monitored on a per location level, or at an aggregate level (e.g., across all of the locations for which a single ad was dynamically customized and published). In some embodiments, the monitoring includes collecting metrics associated with the ads. In some embodiments, the metrics collection is run on a time driven or periodic basis, such as on a daily basis. In some embodiments, metrics are collected by monitoring engine 124 of FIG. 1. In some embodiments, metrics are collected on a per campaign basis, using a campaign identifier for the campaign (where the identifier is provided by Facebook after launching the campaign, and also included in the entries corresponding to location ads, as shown in the example of 432). In some embodiments, the metrics collector queries Facebook for campaign metrics and insights during the life of the campaign (e.g., metrics and insights for the campaign will not be collected beyond the end date specified for the campaign). In some embodiments, the metrics for a given dealership are obtained using the dealership's corresponding Facebook OAuth token.

The metrics data for a particular dealership may then be stored with the dealership's location information (e.g., the metrics data for different dealerships is stored to the different dealerships' respective location objects). The metrics may be further stored by campaign (e.g., using a campaign identifier), where a single location may have participated in multiple campaigns. In some embodiments, the metrics are stored to an ad metrics table such as table 462 of FIG. 4C.

FIG. 4C illustrates an example embodiment of a table for ad metrics. As described above, in some embodiments, platform 102 is configured to collect (e.g., via monitoring engine 124 of FIG. 1, which may include a scheduler that is run periodically, such as every day) all of the metrics for a particular campaign. For example, platform 102 may collect every day, from Facebook (e.g., via an API), the amount of money that was spent, the number of clicks that were obtained, the amount of reach (e.g., number of Facebook users that were reached or that the ad was surfaced to) that was obtained, the number of impressions that were obtained (e.g., if an impression campaign was run), etc. Various other attributes about a campaign can be collected and stored at a campaign level in entry 462 of FIG. 4C. In some embodiments, each entry in the ad metrics table corresponds to an entry in the scheduled location ads table, where an ad metrics entry and a scheduled location ads entry are linked by a common campaign ID or any other appropriate identifier. Thus, the metrics for individual dealership ads may be monitored and queried. The metrics for multiple dealerships may also be aggregated and queried to determine the performance of the overall tenant campaign as a whole. For example, using the campaign IDs, the metrics may be related to particular scheduled location ads. The scheduled location ads may include an identifier of a parent scheduled ad entry in the table of FIG. 4A. Thus, metrics may be linked with specific scheduled location ads as well as overall scheduled ads. In some embodiments, queries may include identifiers such as tenant IDs, campaign IDs, scheduled ads IDs, etc. to determine appropriate information at a desired granularity (e.g., tenant level, location level, campaign level, etc.).

With entries made to the above tables of FIGS. 4A-C, platform 102 can be audited to determine what ads were launched for a particular tenant, and to what locations under the tenant the ad was also launched, as well as the performance of the ads on a campaign level and/or a location level. Users of platform 102 can then determine how their money is being spent, as well as performance information about their ad campaign at various levels of granularity, such as the campaign as a whole, and also at the location level. For example, based on the performance of a particular tenant campaign, the tenant can determine that all location ads associated with the campaign should be paused. As another example, the tenant can modify a template and quickly relaunch a campaign (where multiple location-specific ads are generated from the template using variable substitution). The tenant may then monitor the relaunched campaign to determine any changes in performance of the ad.

Rollover

As described above, in some embodiments, the amount of money spent by locations on the ads is monitored. For example, in some embodiments, platform 102 determines from Facebook, the amount of money spent on advertising on a per-location and/or per-campaign basis.

While different dealerships may have a defined monthly budget to spend on their ads, the amounts that are ultimately spent by the end of the month may differ from the budgeted amounts. In some embodiments, platform 102 is configured to handle spent amounts that differ from budgeted amounts.

For example, while a dealership may have $100 to spend on an ad, not all of the $100 will necessarily be spent. As one example, the funds that are spent on an ad will be dependent on bid amounts (e.g., amount that a user is willing to bid for a click). Thus, even if there is a large amount of funds to be spent on a campaign, if low amounts are bid, then the budget may not be reached.

Typically, on a platform such as Facebook, when a campaign is started, a valid credit card is entered. At the end of the month, an entity such as ACME Motors is billed for the amount that was spent, and the credit card is charged accordingly. Facebook typically does not provide mechanisms by which to track or maintain information about what budget was allocated, how much of it was spent, how the remainder should be applied, etc.

In this example, platform 102 maintains information about ACME Motor's monthly budget. After an ad is launched, platform 102, at the end of the month, can query Facebook to determine what amount of funds was spent for the month (e.g., as part of a metrics and insights collection). Because platform 102 maintains information in budgeting objects about the allowed monthly budget, platform 102 can perform rollover, where an unspent amount for a first month (i.e., the difference between the monthly budget and the actual spent amount) is added to the next month's budget. Platform 102 may maintain this budgeting information and rollover on a per-location basis.

In some embodiments, the rollover functionality is supported by the information that is maintained in tables such as tables 4A-4C. For example, platform 102 can query Facebook for the amount spent for a particular campaign using a campaign identifier. The campaign identifier can be used to access budgeting information about the campaign in scheduled ads table 4A. Further, budgeting information on a per location basis can be obtained by querying table 4B. In table 4C, budgeting information such as the amount spent for a campaign is recorded (where all of the information across tables 4A-4C is linked via identifiers such as campaign IDs). In some embodiments, the monthly amount spent for a campaign is determined by aggregating information collected on a daily basis (e.g., adding together the amounts that were spent on a campaign on a daily basis).

A comparison of the budget for the month can then be used to determine a rollover. The rollover can be determined on a location level. As described above, every campaign that is launched is associated with a campaign ID. A query can then be performed to determine, for a given month, for a given location, the amount of money that a dealership wished to spend (e.g., spend amount, which was specified as part of the location's budgeting framework), where the information is derived from the information in tables 4A and 4B. Any calculated rollover can then be added to the location's spend amount in their budgeting object to increase their budget for the next month. In some embodiments, if a location's monthly spend cap is reached, then they are provided a notification that their monthly spend amount has been reached. In some embodiments, a campaign may be stopped if the budget has been exceeded.

For example, suppose that two dealerships, dealership A and dealership B, both have a monthly budget of $500 (i.e., each dealership is contributing $500 to their advertising budget).

Suppose that for the month of January, dealership A spent $300 on advertising, while dealership B spent $200 on advertising. Thus, dealership A has an unspent amount of $200, while dealership B has an unspent amount of $300. As described above, platform 102 can maintain budgeting information at the location level (e.g., each location has its own budgeting on a per-location basis). Thus, in this example, platform 102 may rollover the determined unspent amounts for the dealerships to February's available budget. For example, dealership A's budget will be $700 ($500+$200 rollover) for the month of February, while dealership B's budget will be $800 ($500+$300 rollover) for the month of February. Because each dealership is associated with its own budgeting metadata, the rollover can be performed at the location level by modifying the respective dealership's budgeting metadata.

Thus, budgeting modifications at the location level (which may be further split on parameters such as campaign types) can be made quickly and efficiently across the various dealerships for ACME Motors. This may be beneficial for invoicing, which can be complex for large numbers of entities, such as in a franchising model, where individual locations are controlling their own budget, with their own invoicing accounts.

In the above example, the functionality provided by platform 102 (e.g., storage of location-level metadata and use of ad templates with variable substitution) allowed for the efficient creation of customized ads for an automotive brand with a large number of dealerships, providing various performance enhancements and benefits (e.g., faster and more efficient processing) at large volumes and scales. The techniques described herein may also provide benefits to smaller entities, such as mom and pop locations that only include one location. For example, information about a small grocery store with one location may change over time (e.g., when a new manager comes in with a new phone number, a new website, etc.). These changes may be made to the location's metadata stored on platform 102. When the office manager for the grocery store wishes to make an ad, that includes some of their information, they need not try to remember what the exact values are for their phone number, website URL, etc. (or whatever location-specific information that they would like to include in the ad), which may lead to errors if the incorrect value is inserted into the ad. Instead, an ad template with place holder variables can be created, as described above. The variables will then be used by platform 102 to automatically populate the appropriate (e.g., most recent and/or correct) values when running an ad campaign. As described above, this reduces the amount of time to create ads, and also reduces the errors that may occur.

Additional Details Regarding Multi-Page Ad Publishing Custom Audiences

In the above examples, targeting may be performed based on advertising goals or pre-configured or pre-defined behavior IDs (e.g., pre-configured segments of Facebook users with certain characteristics) provided by Facebook (or an entity associated with Facebook such as DLX, which sources information from various databases such as dealership databases, the department of motor vehicles (DMV), etc.). When launching a campaign, a user configuring the ad campaign can specify the types of target objects that should be obtained that are related to the ad campaign (and that will be retrieved from each location's targeting metadata when constructing the individual location ads).

As another example, instead of, or in addition to, targeting a preconfigured segment or group of users (e.g., users within a certain radius or zip code, or that have a certain set of behavior(s)), a targeting definition can include a specification of specific individuals that should be focused on for targeting. For example, as described above, pre-seeded default targeting for a location may be set up (e.g., by a tenant), or each location may customize targeting for themselves based, for example, by campaign type. Described below is another example type of targeting that can be configured for a location.

In some embodiments, platform 102 connects (e.g., over a network such as the Internet) with the backends of the ACME dealerships, such as their email marketing systems, dealer management systems (DMS), customer relationship management (CRM) systems, etc. Another example of backends in other industries includes electronic health records (EHR) systems used by hospitals.

Via the connection, platform 102 may obtain or collect user identifiers such as email addresses (or any other user identifier, as appropriate) known to each of the dealerships. For example, each dealership may collect the email addresses of their customers each time a transaction occurs (e.g., car purchase, service, etc.) and store them to their DMS system. Such information may then be pushed or otherwise obtained or collected by platform 102. For example, ACME Motors may grant platform 102 access to the CRM systems of its dealerships. In some embodiments, in addition to the email addresses of users, metadata associated with the email addresses, such as information associated with transactions that have occurred with the users associated with the email addresses (e.g., car purchase, service purchase, parts purchase, etc.), may also be obtained. In some embodiments, the customer contact and transaction information is stored to database 112 (e.g., at the location level). The customer contact and transaction information may also be stored to another database (which may also, in one embodiment, be implemented using Mongo DB).

The collected email addresses may be converted into a target. As one example, using the email addresses and corresponding transaction data, platform 102 may identify or group together those email addresses corresponding to customers who have purchased a car in the last one year. An ad for a promotion or discount on service may be sent to that target group of emails (i.e., those specific customers that have purchased a car should be shown a service ad, because they have the highest propensity to come back and buy service from a dealership). When launching an ad, those specific email addresses (identified for each location of interest, specified when configuring a campaign) may be included in a set or list of email addresses that is sent to Facebook for targeting. In this example, if the email addresses correspond to Facebook accounts, then the Facebook users with those email addresses will be targeted for an ad (i.e., the service ad for a particular dealership will be surfaced to those Facebook users who are associated with email addresses that are associated with purchases of cars within the last year at the particular dealership, which is known based on transaction metadata obtained from the dealership backends). As another example, those customers who have had recently come in for service related transactions can be identified as targets for a new tire promotion or parts-related campaign.

As another example, the contact email addresses may be used to request users to write reviews for the dealerships. In some embodiments, those users that have written reviews for the dealership can be specifically targeted.

In one example embodiment, a user that is configuring targeting for an ad campaign can be presented a UI that provides the user the ability to specify query parameters that will be used to filter email addresses of customers of each location on behalf of which an ad is to be published. The filters that are surfaced in the targeting UI may correspond to metadata information that is available (e.g., different transaction types such as sales, service, and parts for ACME Motors, teeth whitening for a dentist, etc.). In one example, selection of what filters to apply is used to generate parameters for queries that will be performed when customizing targeting for each location. The targeting parameters may then be included in an ad template used to generate location specific ad objects.

One example of targeting parameters usable in a targeting query is as follows:

{{custom_car_sales_90days}}

In the above example, the targeting parameters indicate that a custom audience list is to be created. For a given location, those email addresses associated with customers that have purchased a car (e.g., transaction type) in the last 90 days (e.g., time frame) at the given location are to be identified. In some embodiments, when generating the ad object for the given location, the targeting parameters are used to generate a query that, according to the targeting parameters, will return, for the given location, a list of email addresses corresponding to customers of the given location that bought cars in the last 90 days (e.g., by querying the customer information pertaining or corresponding to the given location). The query will be performed for each and every location on behalf of which the ad is to be published. Each location-specific ad will then be associated with a corresponding list of email addresses for the location's particular customers that met the targeting parameter criteria.

Based on the querying and identification of users that match to the query, the obtained list of emails can be used to generate a file such as a CSV file, which is then uploaded to Facebook with each location's Facebook ad object.

Facebook can then surface ads to those specifically targeted individuals (who may not fall within a specific radius or zip code or Facebook behavior ID). Thus, by obtaining such user contact information from the backends of various locations, a custom audience list that explicitly targets specific or exact individuals may be created quickly by running a query into a data store that includes email addresses (or any other identifier, as appropriate) across locations, where the query may include parameters or conditions specifying the type of users to be identified based, for example, on transaction metadata. Based on the query parameters, the specific users can be identified from the email addresses stored for each location on behalf of which the ad is to be launched. For example, when determining the target audience for the ad object instance corresponding to ACME dealership C, a query can be made to that requests the email addresses of customers of dealership C (e.g., using location identifier for dealership C) that have purchased a car at dealership C (e.g., transaction type) within the last 90 days (e.g., time frame or period, for example, using date of transactions). By querying a data store that stores customer contact information across locations (and on a per-location basis), specific email addresses for customers at specific locations can be obtained based on criteria or conditions such as information associated with transactions of interest. Different industries may have different types of transaction metadata (e.g., a dentist will have different transaction types than an auto dealership). Storage and querying of data for the different industries or types of locations/tenants can be adapted accordingly.

Thus the dealerships can specifically target their own existing customers for their ads, rather than relying on FB to determine what groups of Facebook users to whom the ad will be surfaced.

In some embodiments, custom audiences override any targeting defaults set up by a tenant and/or location. In other embodiments, custom audiences are used in combination with other configured targeting objects.

Dynamic Incentivization

In some cases, businesses may wish to provide incentivization programs. For example, ACME Motors may provide per car incentivization, such as giving customers a $2,000 incentive on a $17,000 vehicle. However, some users may not care about incentives. Described herein are techniques for dynamic incentivization, where an entity such as ACME Motors and/or its dealerships can provide variable incentives to different target audiences. Dynamic incentivization may also be performed for other industries, such as the healthcare industry.

As described above, users can be targeted based on their behaviors, their interests, their language, their age, or other demographic information. For example, as described above, FB can provide information about its subscribers, such as their interests in terms of vehicles—for example, whether they are interested in a new car, an ACME Motors car, a car from a competitor such as Beta Motors, a sedan, a sport utility vehicle (SUV), etc. As will be described herein, different incentives for different target audience segments may be configured as well.

Suppose for example that ACME Motors is launching an advertising campaign for a new car model, the ACME AQ7. A representative of ACME Motors queries Facebook to determine how many users are interested in the ACME AQ7. Suppose that Facebook indicates that there are 100,000 Facebook users that match this set of criteria. If an ad for the car model with a dealer incentive is launched, then all 100,000 users will have the same ad with the same incentive surfaced to them. However, some users may be more receptive to the incentive (and be converted to a buying customer taking advantage of the incentive), while some users may be less receptive.

Using dynamic incentivization, different incentives may be presented to different users based on their characteristics (e.g., incentives may be changed dynamically for different sets of users). For example, better deal incentives can be targeted to those users with a higher propensity to convert into paying customers, while lower incentives may be shown to other users.

As one example, as described above, Facebook (or another partner entity such as DLX which sources information from various databases such as dealership databases, the department of motor vehicles (DMV), etc.) makes available behavior IDs that define criteria for different audience segments of Facebook users. For example, different behavior IDs may correspond to users who are observed to be new vehicle shoppers, used vehicle shoppers, users who are searching about ACME Motors cars, new sedan shoppers for BETA Motors, etc. As described above, such behavioral identifiers may be leveraged to target specific Facebook user segments.

In this example, dynamic incentivization may be performed based on different audience segments, where different incentives may be shown to different segments of users for the same ad. Consider an ad for the ACME AQ7 car. Different versions of the same ad, with different incentives, can be surfaced for different segments of Facebook users. For example, one version of the ad that is targeted to Facebook users that have already shown an interest in ACME vehicles (identified via a corresponding behavioral ID) may be shown with a lower incentive, since they are already ACME Motors fans. This is in contrast to a second variant of the ad that is targeted to Facebook users that are fans of BETA Motors, where the second variant includes an incentive that is relatively higher than that shown in the first version, in order to further incentivize BETA Motors fans to convert to buying an ACME Motors vehicle.

In some embodiments, dynamic incentivization is performed as follows. When targeting for an ad campaign is set up, an admin user may specify that two creative variants for the same ad should be generated, with the incentive marked or indicated as being variable. Each variant of the ACME AQ7 model ad may be associated with different targets (e.g., different behavioral IDs), one for ACME Motors fans, and one for BETA Motors fans. The ads will have the same look and feel, but vary on the incentive that is offered.

In some embodiments, incentives may be marked as variable in ad object templates. Appropriate values can then be substituted in when creating ad object instances. As one example, each dealership can specify incentives (and/or ranges of incentives) that they would be willing to offer for customers of ACME Motors or customers of a competitor such as BETA Motors. Different types of incentives may also be configured for different target audience segments (e.g., professional white glove service for Facebook users who are already owners of the AQ7, and a $5,000 discount for Facebook users that are interested in Beta Motors vehicles). Based on an indication of whether the incentive to be offered in the ad is for competitors or for fans of ACME Motors, different incentive values will be placed into an ad object instance.

Thus, multiple versions of the same ad can be surfaced to different audience segments, with the different versions of the ads offering varying incentives. The budgeting for incentives can then be spread out across the different versions. Further, the performance of the different ads with different incentives can be monitored as described above.

Figure 5:
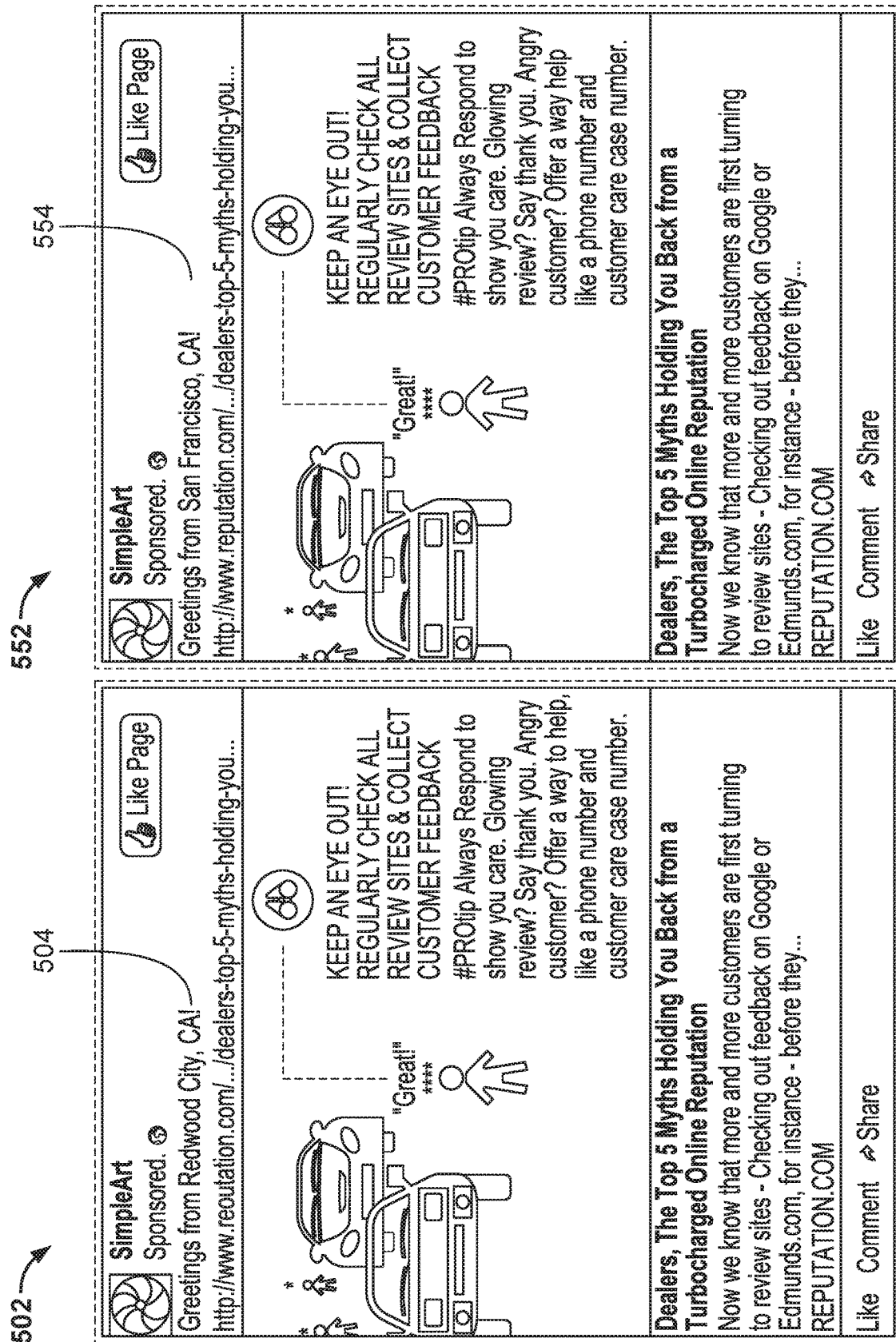
FIG. 5 illustrates an example embodiment of dynamic customization of a single ad for multiple locations.

FIG. 5 illustrates an example embodiment of dynamic customization of a single ad for multiple locations. In this example, Facebook ads 502 and 552 are versions of the same ad that refers to an article on "Dealers, The Top 5 Myths Holding You Back from a Turbocharged Online Reputation." While the ads have the same look and feel, they are customized to their specific locations, where, for example, the greetings (504 and 554) are geographically relevant to the locations on whose pages the ads are to be shown. As one example, the ads are derived from a template where the greetings text includes a variable for populating a location's city and state. When the Facebook ads 502 and 552 are created, the city and state for the locations are automatically populated, resulting in different versions of the single ad being generated.

Figure 6A:
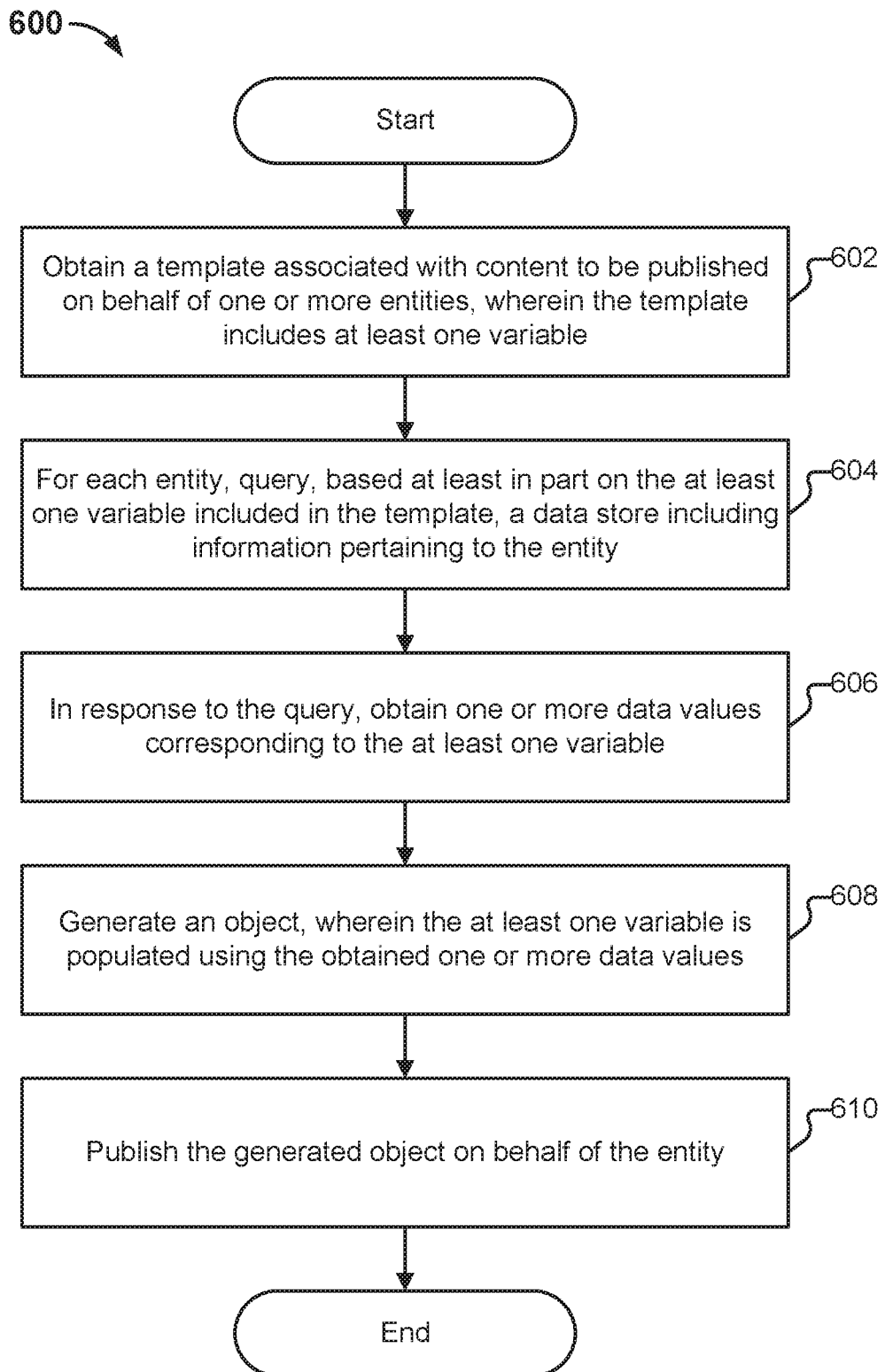
FIG. 6A is a flow diagram illustrating an embodiment of a process for template-based, per-location dynamic ad customization.

FIG. 6A is a flow diagram illustrating an embodiment of a process for template-based, per-location dynamic ad customization. In some embodiments, process 600 is executed by platform 102. The process begins at 602 when a template (e.g., ad template) associated with content to be published on behalf of one or more entities (e.g., locations) is obtained. The template may include placeholder variables which will be populated using values specific to the one or more entities. The placeholder variables may specify parameter names associated with locations' (profile) data, targeting metadata, and/or budgeting metadata. As described above, targeting metadata may include information specifying a target audience to which the content is to be surfaced. Budgeting metadata, as described above, may include information specifying the budgeting for an ad to be launched.

At 604, for each entity, a data store including information pertaining to the entity is queried based at least in part on the at least one variable included in the template. At 606, in response to the query, data values corresponding to the variables included in the template are obtained. At 608, an object is generated, based at least in part on the template, in which the placeholder variables are populated using the values obtained at 606. At 610, the generated object is provided as output to be published on behalf of the entity (where an object is generated for each of the one or more entities using the processing of steps 604-610).

For example, when a customized ad object is generated for the location, a query is made (e.g., to database 112), using an identifier of the location, for values specific to the location that correspond to the placeholder variables in the template from which the generated ad object is derived. In some embodiments, the query specifies a tenant identifier, location identifier, and variable/parameter name of interest. Multiple parameter values may be queried for in a single search. In some embodiments, if corresponding location level values have been previously configured, then those location level values are used to populate the corresponding placeholder variables. In some embodiments, if a location level value has not been specified, then a tenant specified default value is obtained and used to populate a corresponding placeholder variable.

The generated object customized for the location is then published to a service provider such as a social media network, or any other appropriate site on which the ad object may be posted. For example, the generated object is exported on behalf of the location to the service provider using the location's OAuth token (or any other appropriate token or credentials for the location).

Figure 6B:
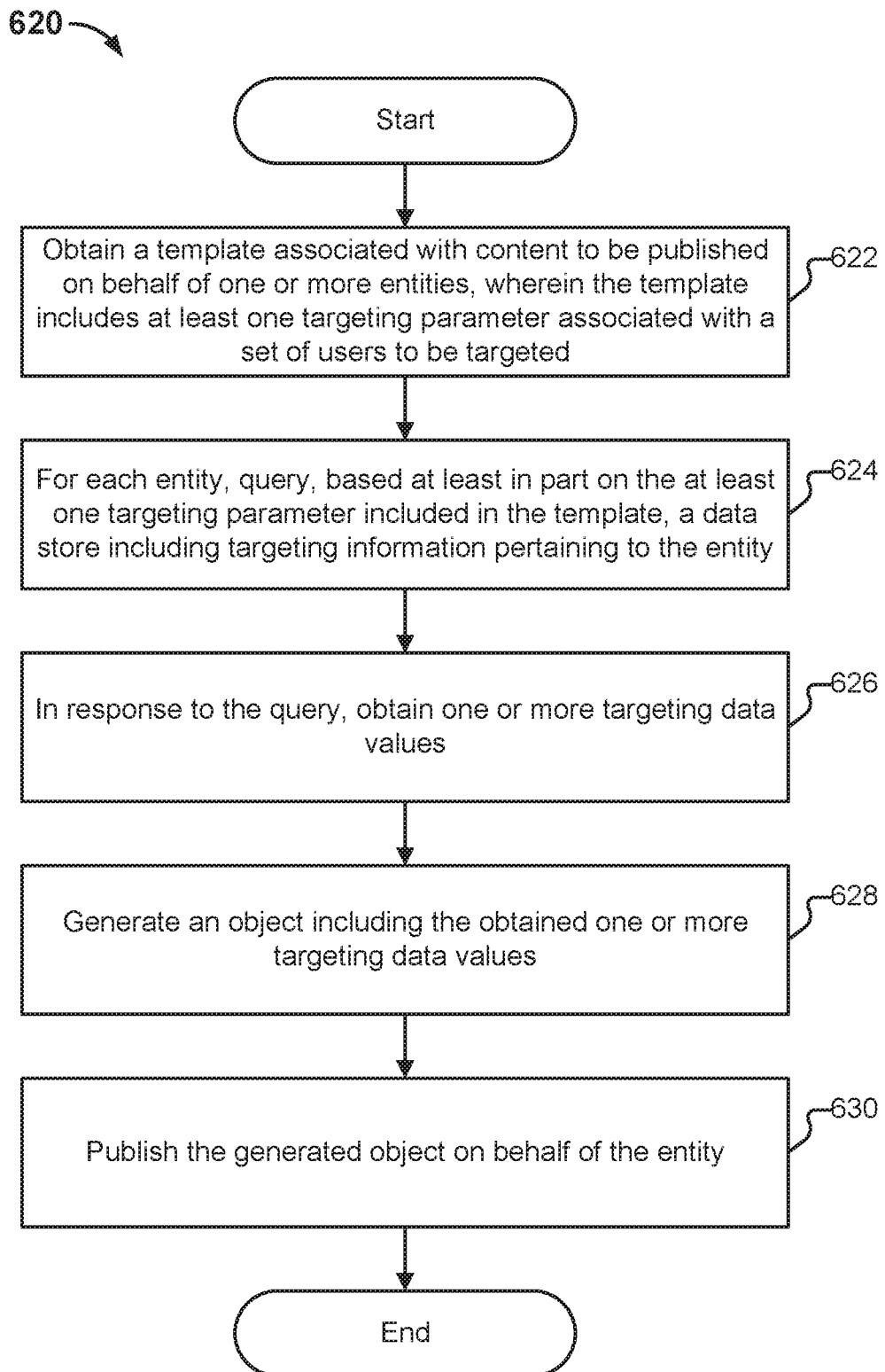
FIG. 6B is a flow diagram illustrating an embodiment of a process for template-based per-location dynamic targeting customization.

FIG. 6B is a flow diagram illustrating an embodiment of a process for template-based per-location dynamic targeting customization. In some embodiments, process 620 is executed by platform 102. The process begins at 622 when a template (e.g., ad template) associated with content to be published on behalf of one or more entities (e.g., locations) is obtained. The template may include at least one targeting parameter associated with a set of users to be targeted. The targeting parameters may include a variable that corresponds to the name of a targeting object. As another example, the targeting parameters may include a specification of filter parameters. The filter parameters may be used to generate custom audiences on a per-location/entity basis.

At 624, for each entity, a data store including targeting information pertaining to the entity is queried based at least in part on the at least one targeting parameter included in the template. At 626, one or more targeting data values (e.g., targeting objects/metadata) are obtained in response to the query. At 628, an object including the obtained one or more targeting data values is generated based at least in part on the template. At 630, the generated object is provided as output to be published on behalf of the entity (where an object is generated for each of the one or more entities using the processing of steps 624-630).

Figure 6C:
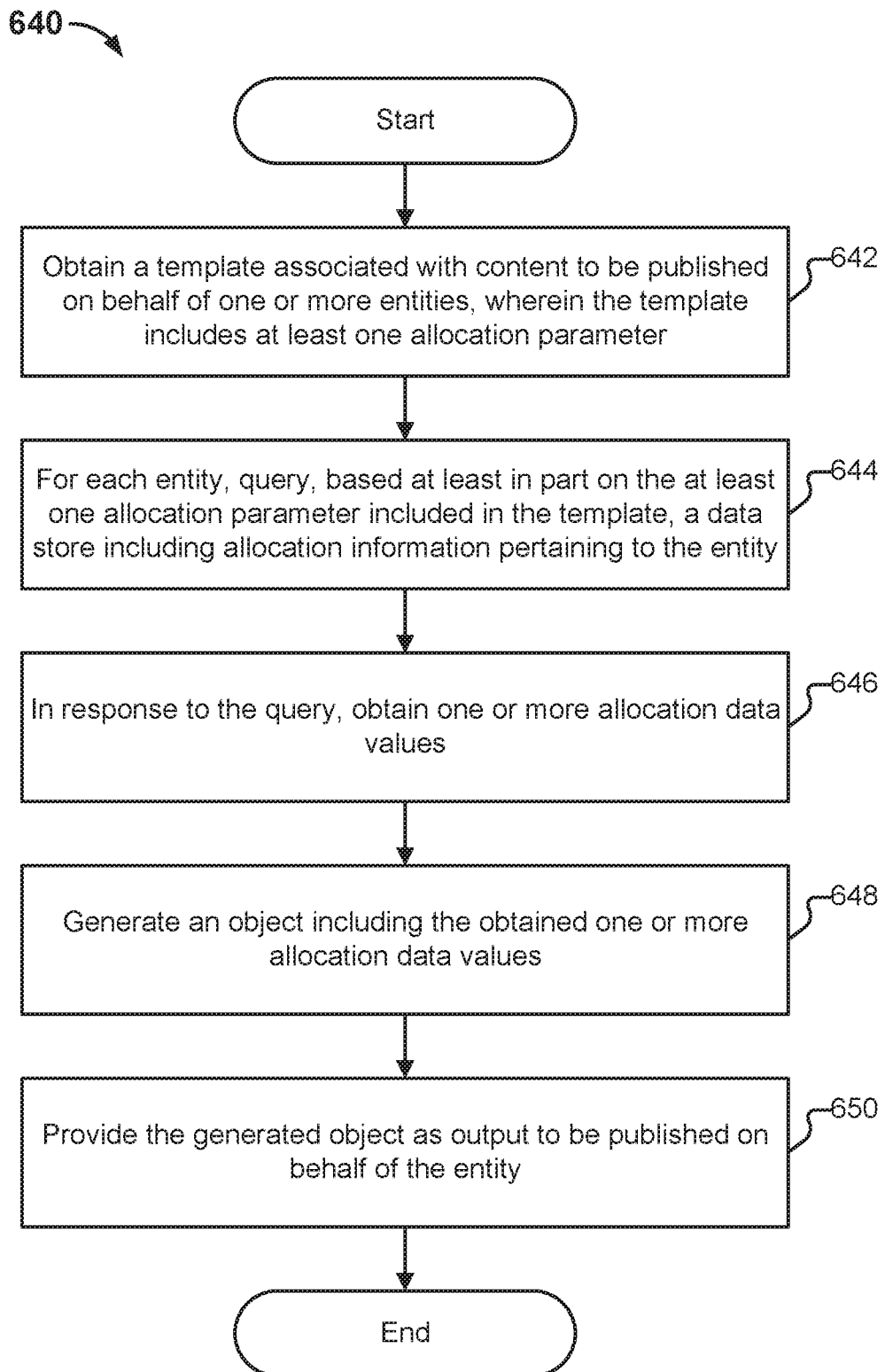
FIG. 6C is a flow diagram illustrating an embodiment of a process for template-based per-location dynamic allocation customization.

FIG. 6C is a flow diagram illustrating an embodiment of a process for template-based per-location dynamic allocation customization. In some embodiments, process 640 is executed by platform 102. The process begins at 642 when a template (e.g., ad template) associated with content to be published on behalf of one or more entities (e.g., locations) is obtained. The template may include at least one allocation (e.g., budgeting) parameter. The allocation parameters may include a variable that corresponds to the name of an allocation or budgeting object.

At 644, for each entity, a data store including allocation/budgeting information pertaining to the entity is queried based at least in part on the at least one allocation parameter included in the template. At 646, one or more allocation or budgeting data values (e.g., budgeting objects/metadata) are obtained in response to the query. At 648, an object including the obtained one or more allocation or budgeting data values is generated based at least in part on the template. At 650, the generated object is provided as output to be published on behalf of the entity (where an object is generated for each of the one or more entities using the processing of steps 644-650).

Example Data Models, Structures, Objects, and Components

The following are example data models, objects, and components associated with multi-page ad publishing and template-based per-location ad customization.

Example Scheduled Ad Object Template

Additional details regarding an ad object template are described below. In some embodiments, and ad object template for an ad that is scheduled for launch is stored to a table such as the scheduled ad table of FIG. 4A. As described above, in some embodiments, a scheduled ad object includes details of an ad to be launched, such as its start time, end time, text, image, budget, etc. In some embodiments, the scheduled ad is used as a tenant level template shared by locations. In some embodiments, an ad can be launched via a UI with a small number of clicks. For example, an admin may select a tenant, select the locations under the tenant to receive the ad, create an instance (or template) of an ad, and then with a single click, the ad may be published to all of the Facebook pages of the selected locations (with different customized versions of the ad generated automatically).

The following is an example of a scheduled ad object (template):

```
{
    "_id": ObjectId("55ef6e40d4c6862ae694b0d9"),
    "adObject": {
        "adCampaignObject": {
            "adAccountId": "act_1502457959986984",
            "name": "ACAMP_20150908_289_07742",
            "objective": "LOCAL_AWARENESS",
            "spendCap": 10000,
            "status": "PAUSED"
        },
        "adSetObject": {
            "adAccountId": "act_1502457959986984",
            "bidAmount": NumberLong("100"),
            "billingEvent": "IMPRESSIONS",
            "dailyBudget": NumberLong("500"),
            "endTime": ISODate("2015-09-15T07:00:00Z"),
            "lifetimeBudget": NumberLong("10000"),
            "name": "AS_20150908_289_07742",
            "optimizationGoal": "REACH",
            "startTime": ISODate("2015-09-08T07:00:00Z"),
            "status": "PAUSED",
            "targeting": {
            "countries": [
                "US"
            ],
            "includedTargetingGeoLocations": {
                "customLocations": [
                    {
                        "addressString": "3282 Auto Center
                        Cir, Stockton, CA",
                        "distanceUnit": "mile",
                        "radius": 15
                    }
                ]
            },
            "pageTypes": [
                "MOBILE_FEED"
            ]
            }
        },
        "adObject": {
            "adAccountId": "act_1502457959986984",
            "creative": {
                "adAccountId": "act_1502457959986984",
                "name": "ACR_20150908_289_07742"
            },
            "name": "AD_20150908_289_07742",
            "status": "PAUSED"
        },
        "customAudience": {
            "adAccountId": "act_1502457959986984",
            "customAudienceUrl": "http://r4e-
cstatic.reputation.com.s3.amazonaws.com/FB-Test/07742.csv",
            "description": "CA_20150908_289_07742",
            "name": "CA_20150908_289_07742",
            "subtype": "CUSTOM"
        },
        "post": {
            "callToAction": {
                "type": "CALL_NOW",
                "value": {
                    "link": "tel:+18554324891"
                }
            },
            "description": "Greetings! 9/30/15.",
            "link": "http://www.reputation.com",
            "message": "Make an appointment today!",
            "name": "reputation",
            "picture": "http://r4e-cstatic.reputation.com.s3.
amazonaws.com/FB-Test/the%20works.2.JPG,"
            "published": 0
        }
    },
    "locationID": "289_07742",
    "startOn": ISODate("2015-09-08T12:24:47.540Z"),
    "tenantID": NumberLong ("289"),
    "updatedDate": ISODate("2015-09-08T23:24:483669Z"),
    "userID": -1
}
```

In some embodiments, to make an ad object template, parameters or variables may be inserted. For example, a location may wish for people to call them by providing their phone number. Different locations will have different phone numbers. A template can be created by placing a placeholder variable such as "{{location-phone}}" in the "phone" field of the ad object, and it will be replaced by the locations' phone numbers when generating the location ads that will be published to Facebook.

The following is an example of two location objects in which the phone number values for respective locations have been populated in the ads for those locations.

location1:
"callToAction": {
"type": "CALL_NOW",
"value": {
"link": "tel:+18554324891"
}
location2:
"callToAction": {
"type": "CALL_NOW",
"value": {
"link": "tel:+18008008000"
}

Example Scheduled Location Ad:

In some embodiments, a location ad is the Facebook ad object that is created that will be published to Facebook. In some embodiments, the launching of location ads is scheduled by making corresponding entries in a table such as the scheduled location ad table of FIG. 4B. In some embodiments, the location ad object includes an ID of the Facebook object created (e.g., adCampaignId, adSetId, etc.). In some embodiments, a scheduled location ad has a reference to a scheduled ad. As one example, five locations may have five different scheduled location ads pointing to the same scheduled ad (template).

{
"_class": "com.reputation.social.ads.domain.publish-.ScheduledLocationAd",
"_id": ObjectId("55ef6e50d4c6862ae694b0da"),
"cDate": ISODate("2015-09-08T23:25:04.496Z"),
"cID": 0,
"eIDs": {
"aId": "6029615866383",
"acId": "6029615864583",
"apId": "302050192430_10153630637747431",
"asId": "6029615860183",
"cId": "6029615858383"
}
"lID": "289_07742",
"pD": ISODate("2015-09-08T23:24:47.540Z"),
"rem": false,
"sID": "FACEBOOK",
"saID": ObjectId("55ef6e40d4c6862ae694b0d9"),
"tID": NumberLong("289"),
"uDate": ISODate("2015-09-08T23:25:04.496Z"),
"uID": -1,
"url": "https://www.facebook.com/BigValleyFord"
}

Targeting

In some embodiments, the targeting framework, as described above, is used to define the type of person to which an ad will be displayed.

The example levels of targeting that are supported include:

Tenant Default: default targeting to all of the locations of this tenant

Location Default: for example, within 50 miles of a location's address

Location Specific: users may specify who they wish to show ads to.

In some embodiments, to maximize the outcome of running an ad campaign, users may wish to have ads shown to those who are willing to take action in response to the ad. For example, a car dealership in California will not want to pay for ads which will be shown to people that live in New York.

As described above, a flow for configuring an ad includes selecting a tenant, then selecting locations, generating an ad template, and launching the ad such that it is published to all of the Facebook pages of the selected location. Those ads may be shown to different people based on the locations' targeting settings.

The following are examples of targeting settings for different locations.

```
location 1' stargeting: "targeting": {
    "countries": [
        "US"
    ],
    "includedTargetingGeoLocations": {
        "customLocations": [
            {
                "addressString": "1001 Marshall Street,
                Redwood City, CA",
                "distanceUnit": "mile",
                "radius": 15
            }
        ]
    },
    "pageTypes": [
        "MOBILE_FEED"
    ]
},
location2'stargeting: location1' stargeting: "targeting": {
    "countries": [
        "US"
    ],
    "includedTargetingGeoLocations": {
        "customLocations": [
            {
                "addressString": "12345 Broadway,
                San Francisco, CA",
                "distanceUnit": "mile",
                "radius": 15
            }
        ]
    },
    "pageTypes": [
        "MOBILE_FEED"
    ]
}
```

Using the techniques described herein, a single ad may be dynamically customized for multiple locations using variables and location metadata. Targeting and budgeting for ads may also be specified at the location level. The single ad may then be pushed to selected locations. As described above, such template-based dynamic ad customization and generation using location metadata simplifies the creation of variations of ads published on behalf of multiple locations. Further, pausing, redoing, and monitoring of ads across locations may also be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      obtain a template associated with content to be published to a network service on behalf of a plurality of locations of a multi-location parent entity, wherein each location in the plurality of locations has an account with the network service, and wherein the template includes at least one targeting parameter;
      generate, for each location in the plurality of locations of the multi-location parent entity, an object to be published to the network service that is specific to a given location, wherein generating the object to be published that is specific to the given location in the plurality of locations comprises:
         based at least in part on an identifier of the given location and the at least one targeting parameter included in the template, querying a data store including targeting information pertaining to the given location;
         in response to the query, obtaining one or more targeting data values for the given location, wherein a targeting data value for the given location comprises an indication of a target audience segment for content published to the network service on behalf of the given location, wherein obtaining the one or more targeting data values for the given location comprises inheriting one or more default targeting data values specified at a tenant level associated with the multi-location parent entity, and wherein the inheriting of the one or more default targeting data values is performed based at least in part on a determination that targeting data values customized for the given location have not been specified; and
         including, in the object generated for the given location, the one or more default targeting data values inherited based at least in part on the determination that targeting data values customized for the given location have not been specified; and
      provide the objects generated for the plurality of locations of the multi-location parent entity as output to be published, on behalf of the plurality of locations, to respective pages of the plurality of locations on the network service; and
   a memory coupled to the one or more processors and configured to provide the one or more processors with instructions.

2. The system of claim 1 wherein the at least one targeting parameter comprises a targeting variable.

3. The system of claim 2 wherein a name of the targeting variable corresponds to a field in the targeting information pertaining to the given location, and wherein the targeting variable is populated with the obtained one or more targeting data values.

4. The system of claim 3 wherein at least some of the one or more inherited targeting data values were previously configured by the multi-location parent entity.

5. The system of claim 1 wherein the targeting information pertaining to the given location includes targeting data values corresponding to different campaign types.

6. The system of claim 1 wherein the obtained one or more targeting data values comprise a list of email addresses associated with customers of the given location.

7. The system of claim 6 wherein email addresses included in the list are identified based on the at least one targeting parameter included in the template, and wherein the at least one targeting parameter includes at least one of a transaction type and a period of time.

8. The system of claim 1 wherein the obtained one or more targeting data values include at least one of a zip code, a radius, and a behavior identifier.

9. The system of claim 1 wherein the one or more processors are further configured to determine, based at least in part on the obtained one or more targeting data values for the given location, an incentive to include in the object generated for the given location.

10. A method, comprising:
obtaining a template associated with content to be published to a network service on behalf of a plurality of locations of a multi-location parent entity, wherein each location in the plurality of locations has an account with the network service, and wherein the template includes at least one targeting parameter;
generating, for each location in the plurality of locations of the multi-location parent entity, an object to be published to the network service that is specific to a given location, wherein generating the object to be published that is specific to the given location in the plurality of locations comprises:
based at least in part on an identifier of the given location and the at least one targeting parameter included in the template, querying, using one or more processors, a data store including targeting information pertaining to the given location;
in response to the query, obtaining one or more targeting data values for the given location, wherein a targeting data value for the given location comprises an indication of a target audience segment for content published to the network service on behalf of the given location, wherein obtaining the one or more targeting data values for the given location comprises inheriting one or more default targeting data values specified at a tenant level associated with the multi-location parent entity, and wherein the inheriting of the one or more default targeting data values is performed based at least in part on a determination that targeting data values customized for the given location have not been specified; and
including, in the object generated for the given location, the one or more default targeting data values inherited based at least in part on the determination that targeting data values customized for the given location have not been specified; and
providing the objects generated for the plurality of locations of the multi-location parent entity as output to be published, on behalf of the plurality of locations, to respective pages of the plurality of locations on the network service.

11. The method of claim 10 wherein the at least one targeting parameter comprises a targeting variable.

12. The method of claim 11 wherein a name of the targeting variable corresponds to a field in the targeting information pertaining to the given location, and wherein the targeting variable is populated with the obtained one or more targeting data values.

13. The method of claim 12 wherein at least some of the one or more inherited targeting data values were previously configured by the multi-location parent entity.

14. The method of claim 10 wherein the obtained one or more targeting data values comprise a list of email addresses associated with customers of the given location.

15. The method of claim 14 wherein email addresses included in the list are identified based on the at least one targeting parameter included in the template, and wherein the at least one targeting parameter includes at least one of a transaction type and a period of time.

16. The method of claim 10 wherein the obtained one or more targeting data values include at least one of a zip code, a radius, and a behavior identifier.

17. The method of claim 10 wherein further comprising determining, based at least in part on the obtained one or more targeting data values for the given location, an incentive to include in the object generated for the given location.

18. A computer program product embodied in a non-transitory computer readable storage medium and comprising computer instructions, which when executed by one or more processors, cause the one or more processors to:
obtaining a template associated with content to be published to a network service on behalf of a plurality of locations of a multi-location parent entity, wherein each location in the plurality of locations has an account with the network service, and wherein the template includes at least one targeting parameter;
generating, for each location in the plurality of locations of the multi-location parent entity, an object to be published to the network service that is specific to a given location, wherein generating the object to be published that is specific to the given location in the plurality of locations comprises:
based at least in part on an identifier of the given location and the at least one targeting parameter included in the template, querying a data store including targeting information pertaining to the given location;
in response to the query, obtaining one or more targeting data values for the given location, wherein a targeting data value for the given location comprises an indication of a target audience segment for content published to the network service on behalf of the given location, wherein obtaining the one or more targeting data values for the given location comprises inheriting one or more default targeting data values specified at a tenant level associated with the multi-location parent entity, and wherein the inheriting of the one or more default targeting data values is performed based at least in part on a determination that targeting data values customized for the given location have not been specified; and
including, in the object generated for the given location, the one or more default targeting data values inherited based at least in part on the determination that targeting data values customized for the given location have not been specified; and
providing the objects generated for the plurality of locations of the multi-location parent entity as output to be published, on behalf of the plurality of locations, to respective pages of the plurality of locations on the network service.

* * * * *

UNITED STATES PATENT AND TRADEMARK OFFICE
CERTIFICATE OF CORRECTION

| | | |
|---|---|---|
| PATENT NO. | : 10,789,615 B1 | Page 1 of 1 |
| APPLICATION NO. | : 15/336563 | |
| DATED | : September 29, 2020 | |
| INVENTOR(S) | : Sathya Krishnamurthy et al. | |

It is certified that error appears in the above-identified patent and that said Letters Patent is hereby corrected as shown below:

In the Drawings

In drawing sheet(s) 6 of 9, figure 5, delete "http://www.reoutation.com/.../dealers-top-5-myths-holding-you..." of " 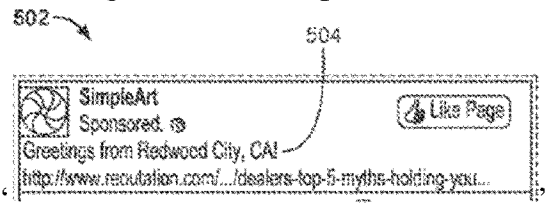" and insert --http://www.reputation.com/.../dealers-top-5-myths-holding-you...--, therefor.

In the Specification

In Column 23, Line(s) 62, delete ""startOn": ISODate("2015-09-08T12:24:47.540Z")," and insert --"startOn": ISODate("2015-09-08T23:24:47.540Z"),--, therefor.

In Column 23, Line(s) 64, delete ""updatedDate": ISODate("2015-09-08T23:24:483669Z")," and insert --"updatedDate": ISODate("2015-09-08T23:24:48.669Z"),--, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*